United States Patent
Arima et al.

(10) Patent No.: US 9,744,769 B2
(45) Date of Patent: *Aug. 29, 2017

(54) GAS-LIQUID SEPARATOR AND INKJET RECORDING APPARATUS USING THE SAME

(71) Applicant: HITACHI INDUSTRIAL EQUIPMENT SYSTEMS CO., LTD., Tokyo (JP)

(72) Inventors: Takahiro Arima, Tokyo (JP); Akira Miyao, Tokyo (JP); Mitsuo Igari, Tokyo (JP); Mamoru Okano, Tokyo (JP); Tomohiro Inoue, Tokyo (JP)

(73) Assignee: HITACHI INDUSTRIAL EQUIPMENT SYSTEMS CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/251,179

(22) Filed: Aug. 30, 2016

(65) Prior Publication Data

US 2016/0368270 A1    Dec. 22, 2016

Related U.S. Application Data

(63) Continuation of application No. 15/062,355, filed on Mar. 7, 2016, now Pat. No. 9,481,175, which is a
(Continued)

(30) Foreign Application Priority Data

Aug. 8, 2012 (JP) ................................. 2012-175880

(51) Int. Cl.
*B41J 2/17* (2006.01)
*B41J 2/175* (2006.01)
(Continued)

(52) U.S. Cl.
CPC ...... *B41J 2/16517* (2013.01); *B01D 19/0042* (2013.01); *B41J 2/165* (2013.01);
(Continued)

(58) Field of Classification Search
CPC ........ B41J 2/08; B41J 2/20; B41J 2002/1853; B41J 2/1714; B41J 2/16517; B41J 2/175; B41J 2/185; B41J 2/18
(Continued)

(56) References Cited

U.S. PATENT DOCUMENTS 3,044,236 A    7/1962  Bearden et al.
4,149,860 A    4/1979  Kulik
(Continued)

FOREIGN PATENT DOCUMENTS

DE    2737911 A1    3/1979
JP    05-005579 A    1/1993
(Continued)

OTHER PUBLICATIONS

Office Action, mailed Oct. 27, 2015, which issued during the prosecution of Japanese Patent Application No. 2012-175880.
(Continued)

*Primary Examiner* — An Do
(74) *Attorney, Agent, or Firm* — Baker Botts L.L.P.

(57) ABSTRACT

A gas-liquid separator includes a casing with a cylindrical chamber inside, a gas-liquid 2-phase inlet pipe which is attached to a wall of the casing and connected to the chamber, a gas outlet pipe for discharging the gas of a gas-liquid mixture flowing into the chamber, and the gas-liquid 2-phase outlet pipe for discharging the liquid as a most part of the gas-liquid mixture flowing into the chamber. A gap is formed around the gas-liquid outlet pipe in the chamber for separating the mixture into liquid and gas using the surface tension and suction force. The gas-liquid sepa-
(Continued)

rator is installed in the inkjet recording apparatus, especially in the print head. The print head is filled with the solvent gas so as to be suctioned from the gutter to reduce the solvent consumption.

17 Claims, 31 Drawing Sheets

Related U.S. Application Data continuation of application No. 13/956,470, filed on Aug. 1, 2013, now Pat. No. 9,308,738.

(51) Int. Cl.
    *B41J 2/19*     (2006.01)
    *B41J 2/165*     (2006.01)
    *B01D 19/00*     (2006.01)
    *B41J 2/185*     (2006.01)
    *B41J 2/18*     (2006.01)
    *B41J 29/38*     (2006.01)

(52) U.S. Cl.
    CPC ................ *B41J 2/18* (2013.01); *B41J 2/185* (2013.01); *B41J 2/19* (2013.01); *B41J 29/38* (2013.01); *B41J 2002/1853* (2013.01)

(58) Field of Classification Search
    USPC ........ 347/25, 30, 34, 36, 77, 82, 83, 89, 90, 347/92, 93, 97
    See application file for complete search history.

(56) References Cited

U.S. PATENT DOCUMENTS

| | | | |
|---|---|---|---|
| 4,204,215 | A | 5/1980 | Nakarai |
| 4,283,730 | A | 8/1981 | Graf |
| 4,476,472 | A | 10/1984 | Aiba et al. |
| 4,629,475 | A | 12/1986 | McArdle et al. |
| 4,929,963 | A | 5/1990 | Balazar |
| 6,299,673 | B1 | 10/2001 | Field et al. |
| 6,454,835 | B1 | 9/2002 | Baumer |
| 6,824,261 | B2 | 11/2004 | Watari et al. |
| 7,238,224 | B2 | 7/2007 | Kent |
| 7,279,031 | B1 | 10/2007 | Wright |
| 7,449,051 | B2 | 11/2008 | Olsen |
| 7,621,982 | B2 | 11/2009 | Kang et al. |
| 8,672,449 | B2 | 3/2014 | Arima et al. |
| 9,308,738 | B2 | 4/2016 | Arima et al. |
| 2007/0052782 | A1 | 3/2007 | Lee |
| 2009/0087683 | A1 | 4/2009 | Shiraishi et al. |
| 2009/0167829 | A1 | 7/2009 | Iijima |
| 2012/0200622 | A1 | 8/2012 | Inoue et al. |
| 2012/0291630 | A1 | 11/2012 | Paragano et al. |

FOREIGN PATENT DOCUMENTS

| | | |
|---|---|---|
| JP | 2003-004343 A | 1/2003 |
| JP | 2009-172932 A | 8/2009 |
| WO | WO 2006/101399 A1 | 9/2006 |

OTHER PUBLICATIONS

CN Office Action mailed Jan. 16, 2015 in CN Patent Application No. 201310332008.3 (English Translation).
The Partial European Search Report, dated Mar. 1, 2016, which issued during the prosecution of European Patent Application No. 13178635.2.

GAS-LIQUID SEPARATOR AND INKJET RECORDING APPARATUS USING THE SAME

CROSS REFERENCE TO RELATED APPLICATIONS

The present application is a continuation of U.S. patent application Ser. No. 15/062,355 filed on Mar. 7, 2016, which is a continuation of U.S. patent application Ser. No. 13/956,470 filed on Aug. 1, 2013, now U.S. Pat. No. 9,308,738, which claims priority from Japanese Patent Application JP 2012-175880 filed on Aug. 8, 2012, the contents of all of which are hereby incorporated by reference into this application.

BACKGROUND

The present invention relates to a gas-liquid separator and an inkjet recording apparatus using the gas-liquid separator.

JP-A-2009-172932 as background of the relevant technical field discloses an inkjet recording apparatus of continuous type configured to charge only particles of ink ejected through a nozzle for printing using a charged electrode, deflect a flight direction of the charged ink particles using the deflection electrode for printing, and recover the ink particles unused for printing through suction by the gutter so as to be used for printing again. Upon suction of the ink particles for recovery, the gutter suctions air around the ink particles together. The suctioned air is continuously fed into the ink container, thus requiring the structure for discharging such air to the outside of the ink container.

JP-A-2003-4343 discloses the air conditioning apparatus provided with the air-liquid separator including the casing, the gas-liquid 2-phase flow inlet pipe that allows inflow of the refrigerant as the gas-liquid 2-phase flow as a result of mixing the gas and liquid phases, the liquid outlet pipe for discharging the liquid phase of the refrigerant, and the gas outlet pipe for discharging the gas phase of the refrigerant. Those pipes are connected to openings formed in a wall of the casing, respectively.

For example, the inkjet recording apparatus of continuous type as disclosed in JP-A-2009-172932 is configured that the gutter suctions the ink particles for recovery together with peripheral air. In the ink recovery path where the ink and air are flowing simultaneously, the solvent component contained in the ink is volatilized, and dissolved in air to form saturated solvent gas. The solvent gas is discharged from the ink container to the outside of the apparatus, which makes a density of the ink in the ink container high by the degree corresponding to volatilization volume of the solvent component in the ink recovery path. In order to prevent deterioration in the printing quality owing to change in the ink density, the ink container is configured to replenish the solvent by quantity corresponding to the volatilized solvent component in the ink recovery path. Volatilization of the solvent component of the ink is facilitated as the temperature inside the main body of the apparatus becomes higher. This may lead to deterioration in the running cost of the inkjet recording apparatus of the customer. The gas-liquid separator disclosed in JP-A-2003-4343 has a problem of failing to perform the gas-liquid separation upon change in its set-up direction.

It is an object of the present invention to provide an inkjet recording apparatus that reduces the solvent consumption in operation using the gas-liquid separator which can be set up in an arbitrary direction.

SUMMARY OF THE INVENTION

The present invention provides a gas-liquid separator which includes a casing with a chamber inside, a gas-liquid 2-phase inlet pipe attached to the casing and connected to the chamber, a gas outlet pipe for discharging gas in the chamber, and a gas-liquid 2-phase outlet pipe for discharging liquid in the chamber. A gap is formed around the gas-liquid 2-phase outlet pipe in the chamber.

The present invention provides the gas-liquid separator that has a compact structure and free set-up directivity, and further provides the inkjet recording apparatus capable of reducing the solvent consumption.

DESCRIPTION OF THE PREFERRED EMBODIMENTS

Figure 1:
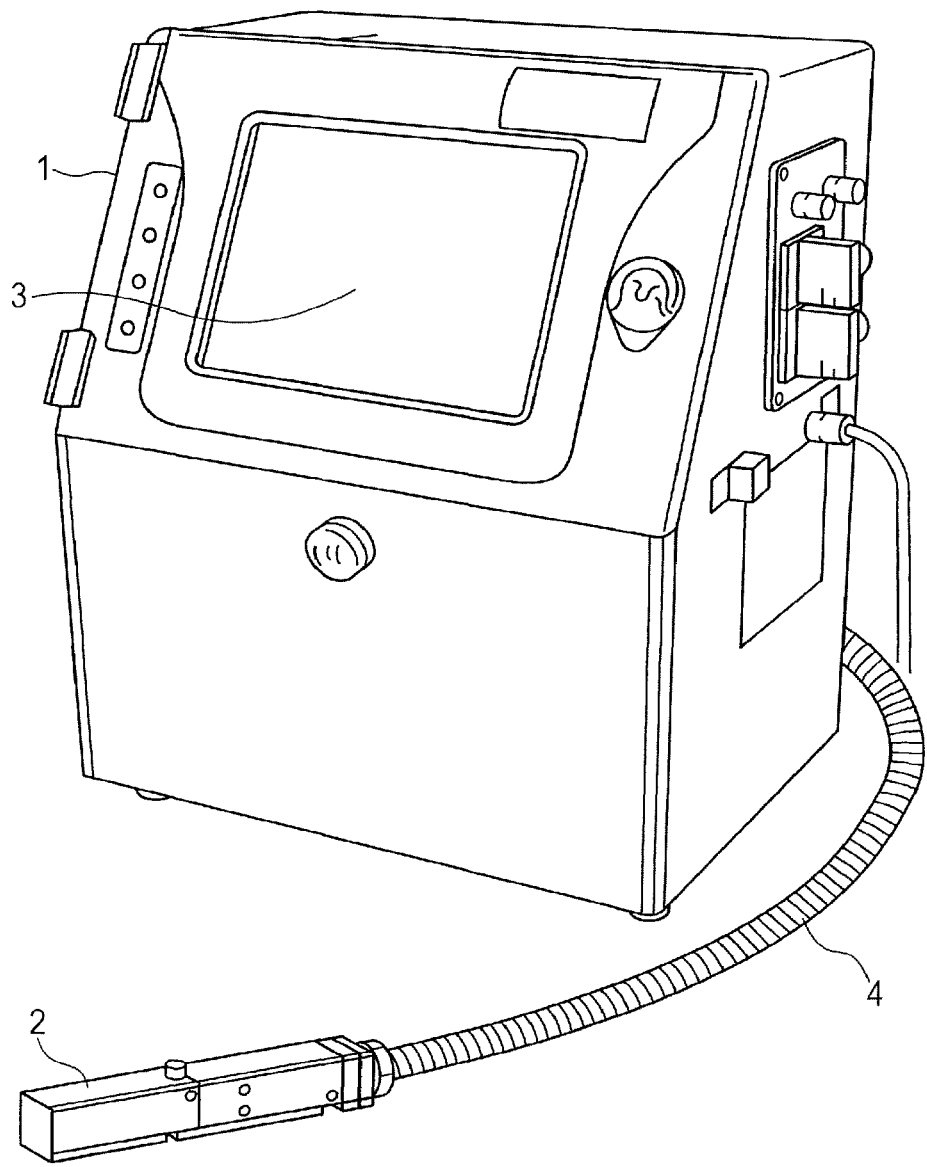
FIG. 1 is a perspective view of appearance of an inkjet recording apparatus according to the present invention.

An embodiment according to the present invention will be described referring to the drawings. The present invention, however, is not limited to the examples as described below.

First Example

FIG. 1 is a perspective view of an appearance of an inkjet recording apparatus according to the present invention. Referring to FIG. 1, a reference numeral 1 denotes a main body of the inkjet recording apparatus, 2 denotes a print head, 3 denotes an operation display unit, and 4 denotes a cable. The main body 1 of the inkjet recording apparatus includes the operation display unit 3, and the print head 2 provided outside. The main body 1 and the print heat 2 are connected via the cable 4.

Figure 2:
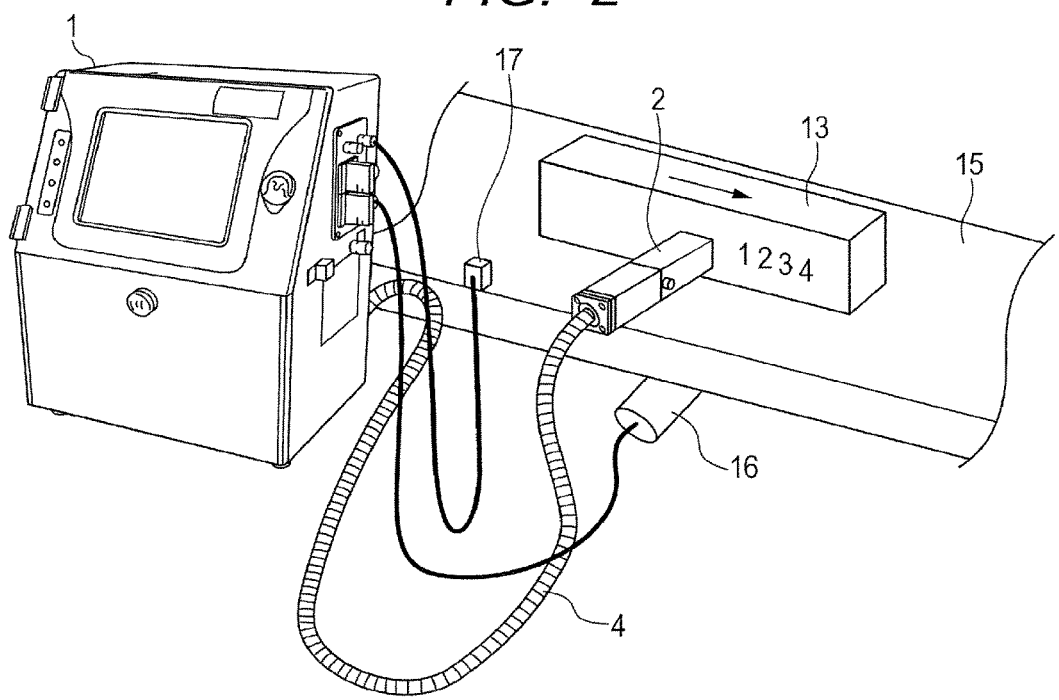
FIG. 2 is a perspective view showing a state where the inkjet recording apparatus is used.

A state where the inkjet recording apparatus is used will be described referring to FIG. 2. As FIG. 2 shows, the reference numeral 1 denotes the main body of the inkjet recording apparatus, 2 denotes the print head, 4 denotes the cable, 13 denotes an object subjected to printing of a numeral and a character, 15 denotes a belt conveyor which conveys the object to be printed, 16 denotes a rotary encoder which measures a conveyance distance of the belt conveyor 15, and 17 denotes a printing sensor.

An inkjet recording apparatus is set up on a production line in the factory for producing food or beverage. The main body 1 is installed at a location so as to allow a user to operate. The print head 2 is provided at a position adjacent to the object to be printed 13 which is conveyed on the production line such as the belt conveyor 15. The encoder 16 for outputting a signal in accordance with the conveying speed to the inkjet recording apparatus 400, and the printing sensor 17 for detecting the object to be printed 13 and outputting the signal that instructs printing to the inkjet recording apparatus 400 are provided on the production line such as the belt conveyor 15 for the purpose of allowing the printing with the same width irrespective of the different conveying speed. They are connected to a not shown control unit in the body 1. The control unit controls an amount and timing of charge to an ink particle 7C discharged from a nozzle 8 in accordance with the signal from the encoder 16 and the printing sensor 17 so that the ink particle 7C charged and deflected is adhered to the object to be printed 13 for printing operation while passing over the area around the print head 2.

Figure 3:
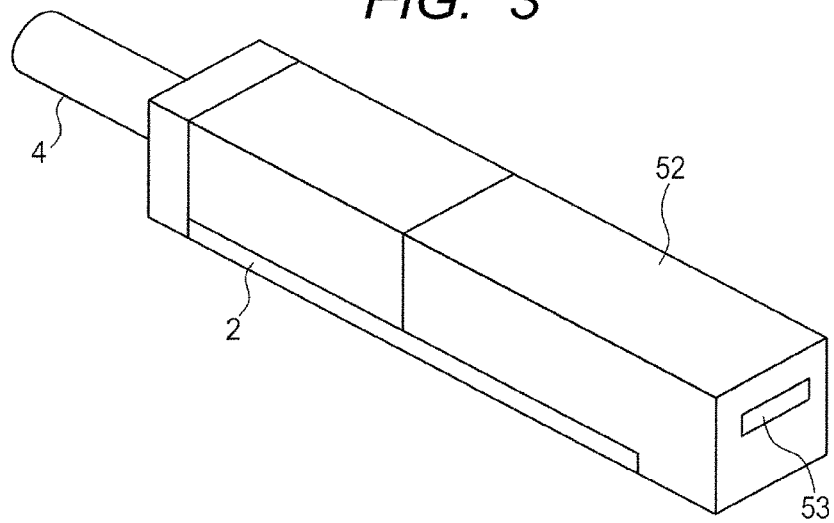
FIG. 3 is a perspective view showing an appearance of a print head of the inkjet recording apparatus.

A structure of the print head 2 will be described referring to FIG. 3. Referring to FIG. 3, the print head 2 is covered with a print head cover 52. The print head 2 includes a nozzle 8 which ejects ink particles, a charged electrode 11 which charges the ink particles for printing, a deflection electrode 12 which deflects the ink particles, and a gutter 14 which recovers the ink particles unused for printing, which are arranged on a line inside. A gas-liquid separator 100 is provided adjacent to the nozzle 8. A reference numeral 53 denotes an opening through which the ink particles for printing are ejected. The gas-liquid separator 100 is set up in the print head as shown in FIG. 3. However, the set-up location is not limited to the one as described above. The gas-liquid separator will be described later in details.

Figure 4:
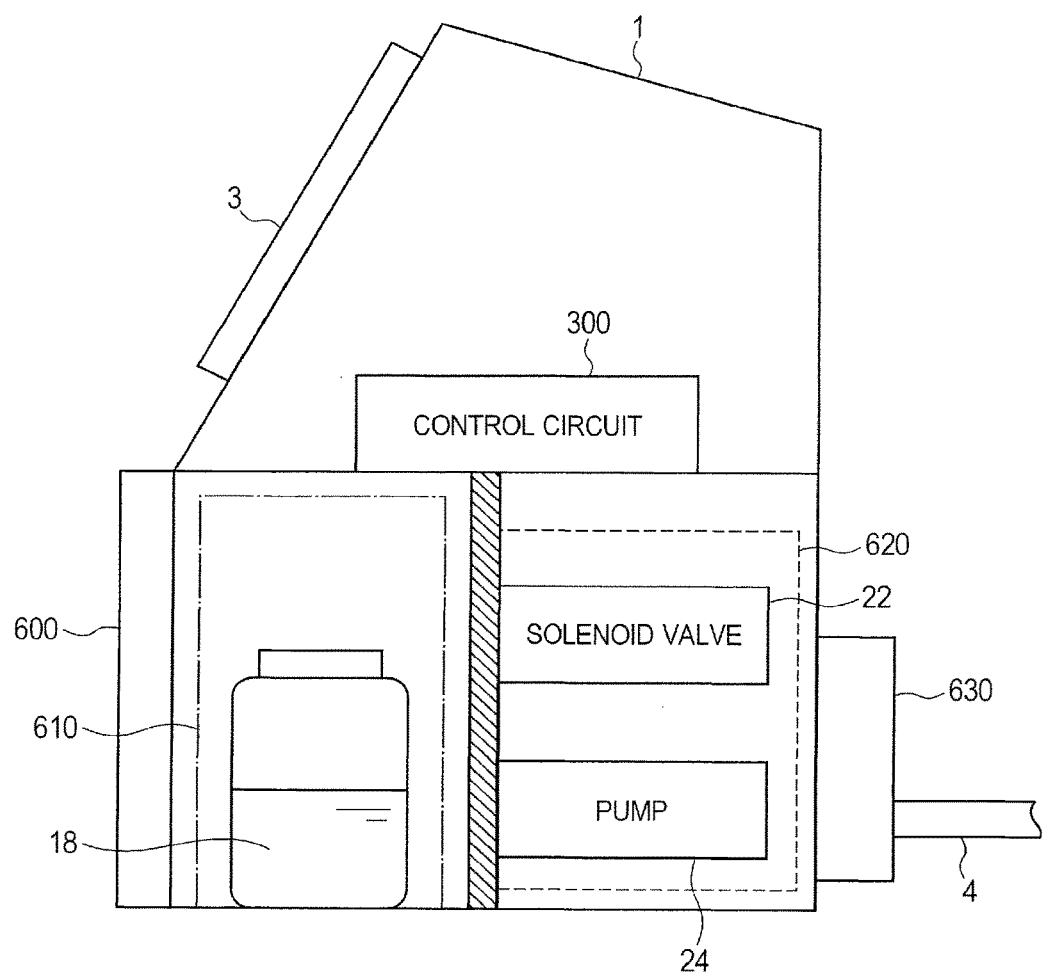
FIG. 4 is a conceptual view showing an inner structure of a main body of the inkjet recording apparatus.

A structure of the main body 1 of the inkjet recording apparatus will be described referring to FIG. 4. FIG. 4 is a longitudinal sectional view of the inkjet recording apparatus. Electrical components such as a control circuit 300 are placed at an upper part of the main body 1, and the operation display unit 3 is provided on the upper front surface. An ink container 18 filled with the ink supplied to the nozzle, a solvent container (not shown) filled with the solvent supplied to the nozzle, and a densitometer which detects an ink density inside the ink container 18 are provided at a lower front side 610 of the main body 1. Circulation control components such as a solenoid valve 22 and a pump unit 24 are contained at a lower back side 620 of the main body 1. A high pressure power line and a control line are provided on a back surface of the main body 1, which are connected to the print head 2 from an outer unit 630 via the cable 4 for applying power to pipes and electrode for receiving and discharging the ink flow. By opening a door 600 on the front surface at the lower part 610 of the main body 1, the ink container 18 and the solvent container are taken out of the main body 1. This makes it possible to allow easy maintenance such as replenishment and disposal of the ink and the solvent.

Figure 5:
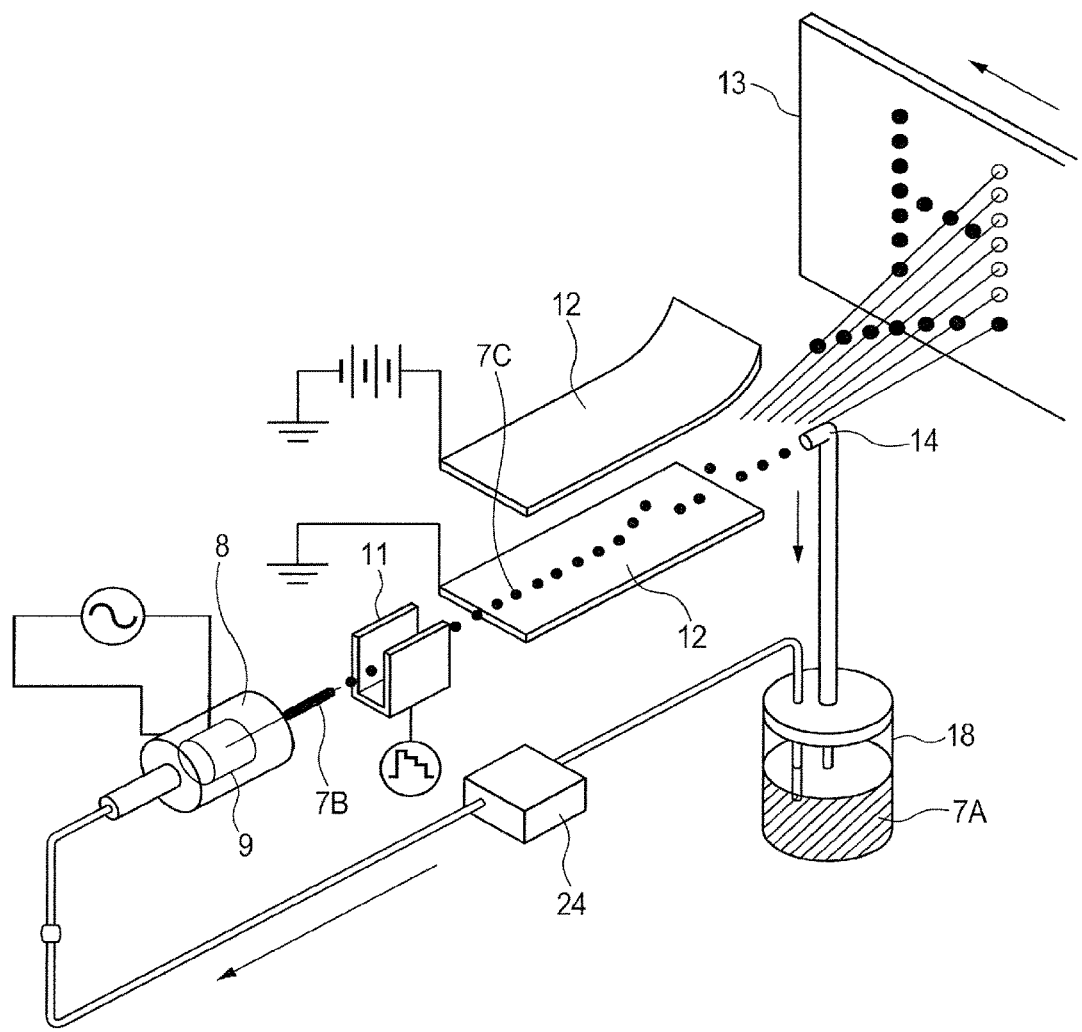
FIG. 5 is a schematic view showing an operating principle of the inkjet recording apparatus.

The operating principle of the inkjet recording apparatus will be described referring to FIG. 5. As FIG. 5 shows, a reference numeral 18 denotes the ink container, 7A denotes the ink, 24 denotes a pump that presses and feeds the ink, 9 denotes an electrostrictive element which oscillates at a predetermined frequency in response to a voltage application, 8 denotes a nozzle which discharges the ink, and 7B denotes an ink column. A reference numeral 11 denotes the charged electrode for charging the ink particle, 7C denotes the ink particle, 12 denotes the deflection electrode, 13 denotes an object to be printed, and 14 denotes the gutter which recovers the ink particles unused for printing.

The ink 7A in the ink container 18 is suctioned and pressurized by the pump 24 into the ink column 7B so as to be discharged from the nozzle 8. The nozzle 8 is provided with the electrostrictive element 9 configured to atomize the ink column 7B discharged from the nozzle 8 by applying the oscillation at the predetermined frequency to the ink. The number of the thus generated ink particles 7C is determined by the frequency of the excitation voltage applied to the electrostrictive element 9, that is, the same number as the frequency. The ink particles 7C may be charged through application of the voltage corresponding to the print information using the charged electrode 11.

The ink particle 7C charged by the charged electrode 11 is deflected under the force proportional to the charged amount while flying in the electric field between the deflection electrodes 12, and further flies toward and lands on the object to be printed 13. At this time, the position on which the ink particle 7C is landed is changed in the deflection direction dependent on the charged amount. It is possible to land the particle in the direction orthogonal to the deflection direction by moving the object to be printed 13 performed by the production line in the direction orthogonal to the deflection direction. The character is printed by a plurality of landed particles. The ink particle 7C unused for printing linearly flies between the deflection electrodes 12, and is captured by the gutter 14 so as to be recovered into the main ink container 18 through the path.

Figure 6A:
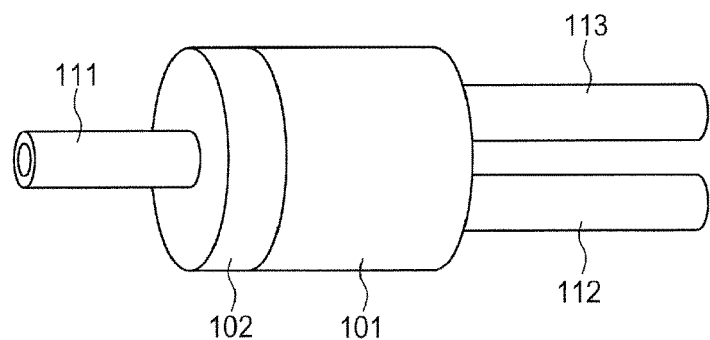
FIG. 6A is a perspective view showing an appearance of a gas-liquid separator according to a first example of the present invention.
Figure 6B:
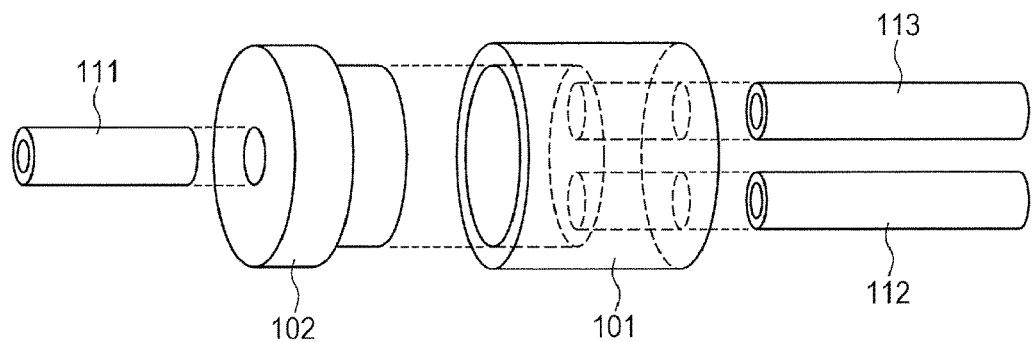
FIG. 6B is an exploded perspective view showing the gas-liquid separator of the first example.
Figure 7A:
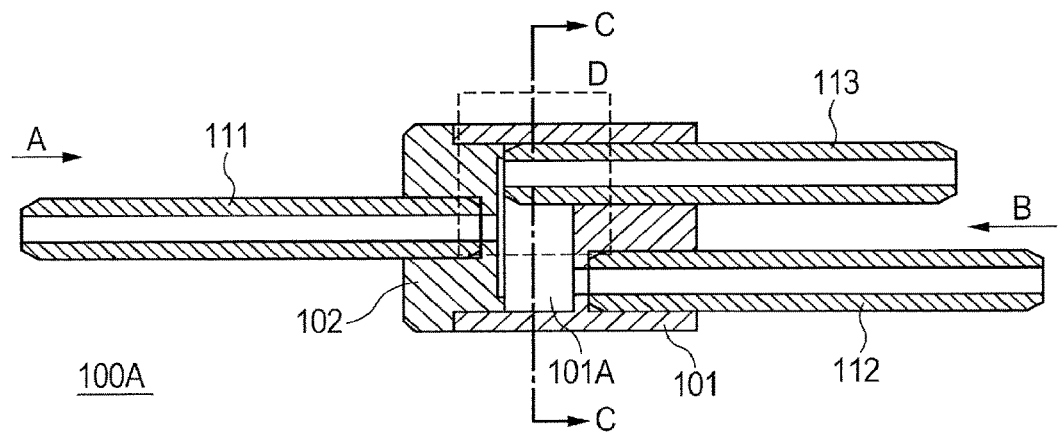
FIG. 7A is an overall sectional view showing the gas-liquid separator of the first example.
Figure 7B:
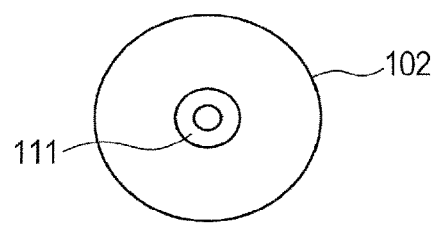
FIG. 7B is a view of FIG. 7A seen from a direction A.
Figure 7C:
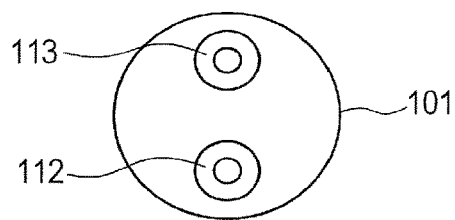
FIG. 7C is a view of FIG. 7A seen from a direction B.
Figure 7D:
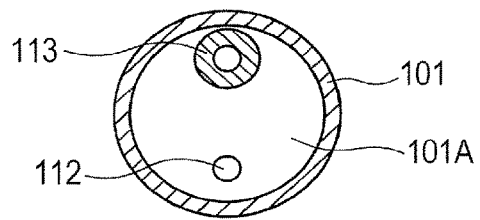
FIG. 7D is a sectional view of a chamber center taken along line C-C of FIG. 7A.
Figure 8:
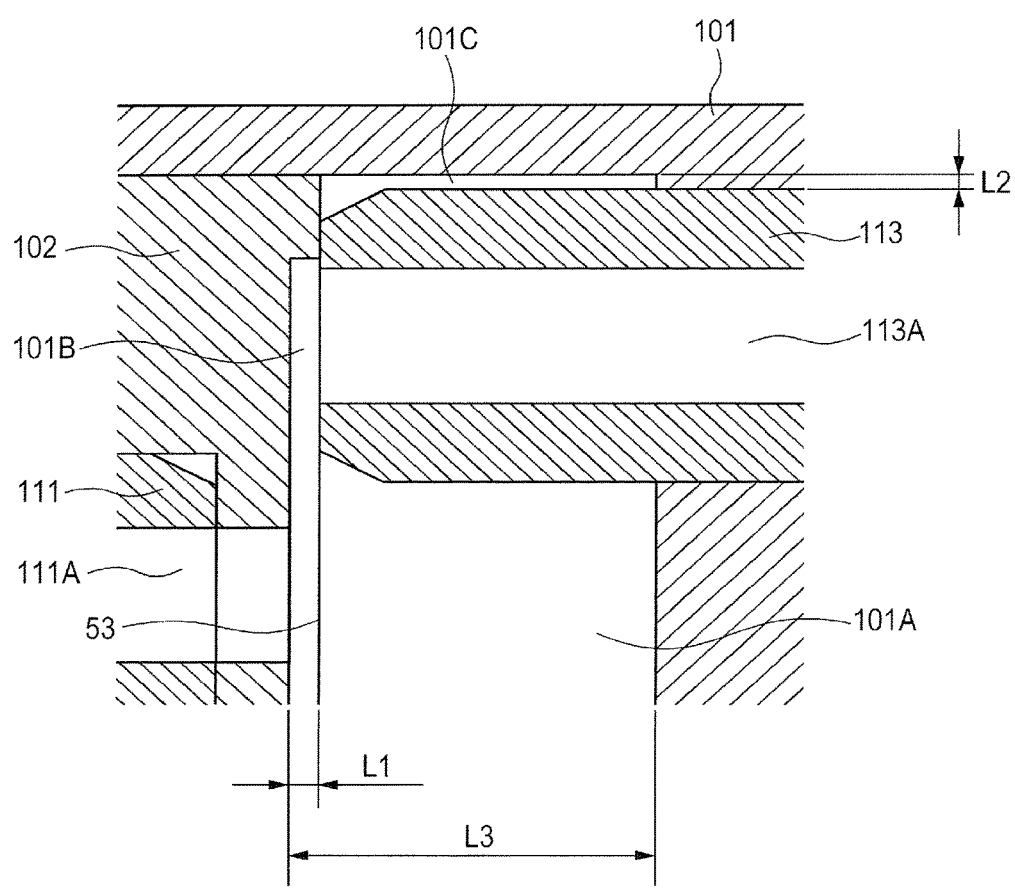
FIG. 8 is an enlarged view of a dotted frame D shown in FIG. 7A.

The gas-liquid separator of the first example according to the present invention will be described referring to FIGS. 6A to 8. The gas-liquid separator serves to separate gas from liquid, functioning in recovery of the solvent. FIG. 6A is a perspective view showing an appearance of the gas-liquid separator according to the first example. FIG. 6B is an exploded perspective view of FIG. 6A. FIG. 7A is an overall sectional view of the gas-liquid separator, and FIG. 7B is a view of FIG. 7A seen from a direction A. FIG. 7C is a view of FIG. 7A seen from a direction B. FIG. 7D is a sectional view of a chamber center taken along line C-C of FIG. 7A. FIG. 8 is a partially enlarged view of a dotted frame D shown in FIG. 7A. Referring to FIGS. 6A to 8, a reference numeral 111 denotes a gas outlet pipe, 102 denotes a casing through which the gas outlet pipe 111 is inserted and fixed, 112 denotes a gas-liquid 2-phase inlet pipe, 113 denotes a gas-liquid 2-phase outlet pipe, and 101 denotes a casing through which the gas-liquid 2-phase inlet pipe 112 and the gas-liquid 2-phase outlet pipe 113 are inserted and fixed, and 101A denotes a chamber. A not-shown pump is provided at a secondary side of the gas-liquid 2-phase outlet pipe 113 for generating the suction force which works from the gas-liquid separator 100 to the pump side.

As FIGS. 6A and 6B show, the gas-liquid separator 100 of the first example includes the casing 102 with a columnar shape and a hole formed at the center by cutting the outer periphery from a predetermined position for fitting, through which the gas outlet pipe 111 is inserted and fixed, and the casing 101 with a columnar and cylindrical shape for fitting to a predetermined position, including holes through which two pipes, that is, the gas-liquid 2-phase inlet pipe 112 and the gas-liquid 2-phase outlet pipe 113 are inserted and fixed. Those two casings are fitted to form a chamber with a spatial area at the center part. Various types of methods of connecting the casings 101 and 102, the gas outlet pipe 111, the gas-liquid 2-phase inlet pipe 112, and the gas-liquid 2-phase outlet pipe 113, respectively may be considered to be conducted by welding, using the adhesive, press-fitting, fastening with screws, and the like which are not limited. An outer dimension of the casing of the gas-liquid separator 100 (combination of casings 101 and 102) has an outer diameter of $\phi 8$ mm and the height of 10 mm, approximately.

FIG. 7A is a sectional view of the gas-liquid separator 100A of the first example. When forming the gas-liquid separator 100A, an enclosure is formed by fitting and combining the casings 101 and 102 while forming the cylindrical chamber 101A inside. The gas outlet pipe 111 is communicated with the chamber 101A from the center of one end surface of the casing 102. A top end of the gas-liquid 2-phase inlet pipe 113 is inserted to an innermost part of the chamber 101A, and the gas-liquid 2-phase inlet pipe 112 is not inserted to the innermost part of the chamber 101A but to the inner wall that forms the chamber 101 A.

FIG. 7B is a view of FIG. 7A seen from the direction A. FIG. 7C is a view of FIG. 7A seen from the direction B. Referring to FIGS. 7B and 7C, the gas outlet pipe 111 is provided at the center of the casing 102 in the form of the columnar enclosure. The cylindrical casing 101 opposite the casing 102 has the gas-liquid 2-phase outlet pipe 113 and the gas-liquid 2-phase inlet pipe 112 symmetrically arranged and fixed with respect to the center point. FIG. 7D is a sectional view of the center of the chamber 101A taken along line C-C of FIG. 7A. Inside the chamber 101A, a gap is generated between an outer surface of the gas-liquid 2-phase outlet pipe 113 and the inner wall of the casing 101.

FIG. 8 is an enlarged view of a dotted frame D shown in FIG. 7A. Referring to FIG. 8, a top end of the gas outlet pipe 111 is inserted to be near an inner wall 53 of the casing 102, and fixed. A cylindrical recess portion with a depth of L1 is formed in the inner wall 53 so as to generate a gap 101B between the casing 102 and the gas-liquid 2-phase outlet pipe 113. Furthermore, a gap 101C is generated between the inner peripheral wall of the casing 101 and the outer peripheral wall of the gas-liquid 2-phase outlet pipe 113. Referring to FIG. 8, a reference numeral 111A denotes a hole of the gas outlet pipe, and 113A denotes a hole of the gas-liquid 2-phase outlet pipe.

As described above, the gaps 101B and 101C generated around the gas-liquid 2-phase outlet pipe 113 allow the suction force of the pump connected to the gas-liquid 2-phase outlet pipe 113 to be transferred to those gaps so that the liquid accumulated in the chamber 101A is suctioned via the gaps 101B and 101C, and discharged to the gas-liquid 2-phase outlet pipe 113 from where the liquid may be recovered. Specifically, a distance L1 between the top end of the gas-liquid 2-phase outlet pipe 113 and the inner wall of the chamber is shorter than the gap between the gas-liquid 2-phase outlet pipe 113 and the gas-liquid 2-phase inlet pipe 112, or a length L3 of the chamber 101A in the cylindrical axial direction. In the first example, values of the distance L1 is set to 0.3 mm (L1=0.3 mm), and the distance L3 is set to 3 mm (L3=3 mm) adapted to the surface tension of the liquid. When setting a distance L2 between the gas-liquid 2-phase outlet pipe 113 and the inner wall of the chamber 101A to 0.3 mm (L2=0.3 mm) which is equivalent to the distance of L1=0.3 mm, the liquid is collected around the gas-liquid 2-phase outlet pipe 113. The gas-liquid separator 100A according to the present invention allows separation between gas and liquid even if the gas outlet pipe 111 and the gas-liquid 2-phase inlet pipe 112 are interchanged.

According to the first example, the gas-liquid separator 100A is provided on the path through which the gas-liquid 2-phase flow is passing. If the gas-liquid flows from the gas-liquid 2-phase inlet pipe 112, discharge of the liquid from the gas outlet pipe 111 may be prevented (if the gas-liquid flow is supplied from the gas outlet pipe 111, discharge of the gas from the gas-flow 2-phase inlet pipe 112 may be prevented). The gas-liquid separator 100A of the example is configured to separate between gas and liquid using a difference in the surface tension between the liquid and gas, which is unlikely to be influenced by orientation of the gravity resulting from various set-up postures right to left or up and down. As another modified example, the position of the gas outlet pipe 111 connected to the casing 103 may be positioned shifted from the center.

Figure 22A:
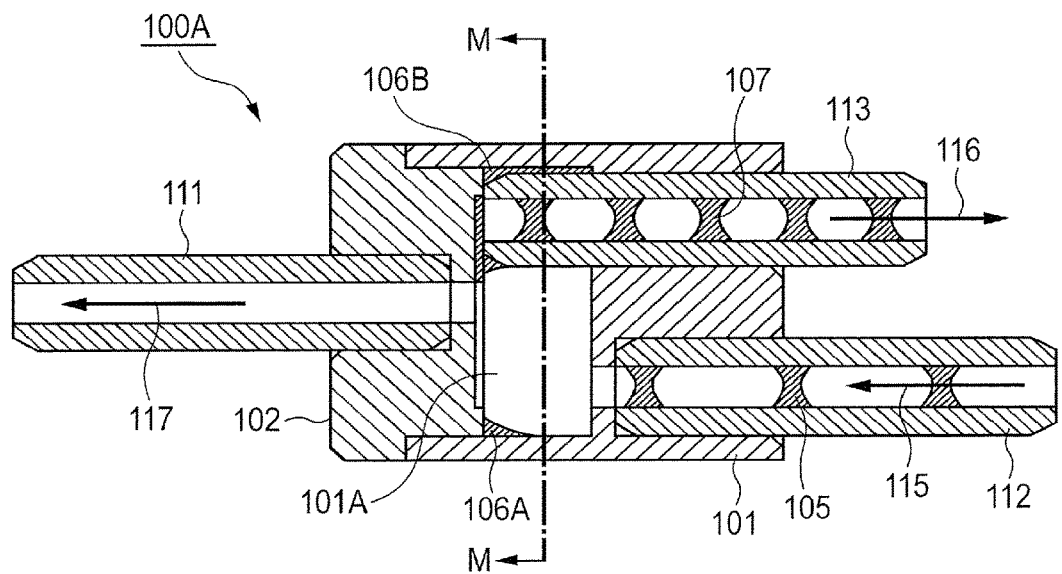
FIG. 22A is a view showing a liquid flow in the gas-liquid separator of the first example.
Figure 22B:
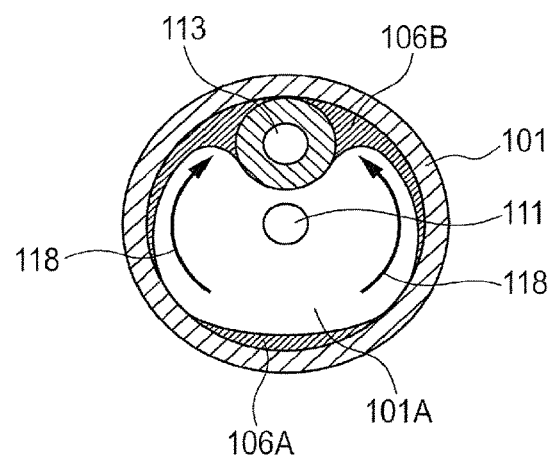
FIG. 22B is a sectional view of a chamber center taken along line M-M of FIG. 22A.

Operations of the gas-liquid separator 100A of the first example according to the present invention will be described. Operations of the separator having the gas-liquid 2-phase inlet pipe 112 provided at the side of the casing 101 will be described referring to FIGS. 22A and 22B. FIG. 22A illustrates the inner structure of the gas-liquid separator 100A and the gas-liquid flow. FIG. 22B is a sectional view of the separator taken along line M-M of FIG. 22A. In the gas-liquid 2-phase inlet pipe 112 of the casing 101, a mixture of gas and liquid 105 flows into the chamber 101A in an arrow direction along a gas-liquid flow 115. Then in the gas-liquid 2-phase outlet pipe 113 provided in the casing 101 recovers the liquid from the chamber 101A in the arrow direction in the state where the gas and the liquid 107 are mixed. A pump is provided at the secondary side of the gas-liquid 2-phase outlet pipe 113 under the suction force for separating and recovering the liquid 107.

When the liquid 105 in the gas-liquid 2-phase inlet pipe 112 flows into the chamber 101A, it is temporarily accumulated in the lower part under gravity. A liquid 106A accumulated in the lower part flows along the wall surface of the chamber 101A in the arrow direction of a liquid recovery flow 118, and a liquid 106B is collected in a gap between the pipe 113 and the chamber 101A (101B and 101C shown in FIG. 8). Thereafter, the liquid 106B is suctioned from the gas-liquid 2-phase outlet pipe 113. The chamber 101A may be formed to enhance wettability of the peripheral wall surface through surface treatment, grinding work or selection of the material for use so that the liquid 106A is likely to be collected in the gap (101B and 101C shown in FIG. 8). Preferably, the wettability exhibits hydrophilicity because high wettability improves the recovery performance.

As the liquid 106B in the chamber 101A may be suctioned by the gas-liquid 2-phase outlet pipe 113, the gas outlet pipe 111 inserted into the casing 102 is allowed to flow only the gas from the chamber 101A in an arrow direction of a gas-liquid recovery flow 116. The gas-liquid recovery flow 116 allows the gas to be discharged, which is hardly mixed with the liquid 115, and further discharged. Dependent on the flow rate of the inflow liquid 105, if the flow rate of the gas-liquid recovery flow 116 is equal to or higher than 20% of that of the gas-liquid inlet flow 115, the liquid 105 may be recovered. For example, assuming that the flow rate of the gas-liquid inlet flow 115 is 200 ml/m, the flow rate of the gas-liquid recovery flow 116 is 40 ml/m (=200 ml/m), and the flow rate of a gas exhaust flow 117 is 160 ml/m.

Figure 23A:
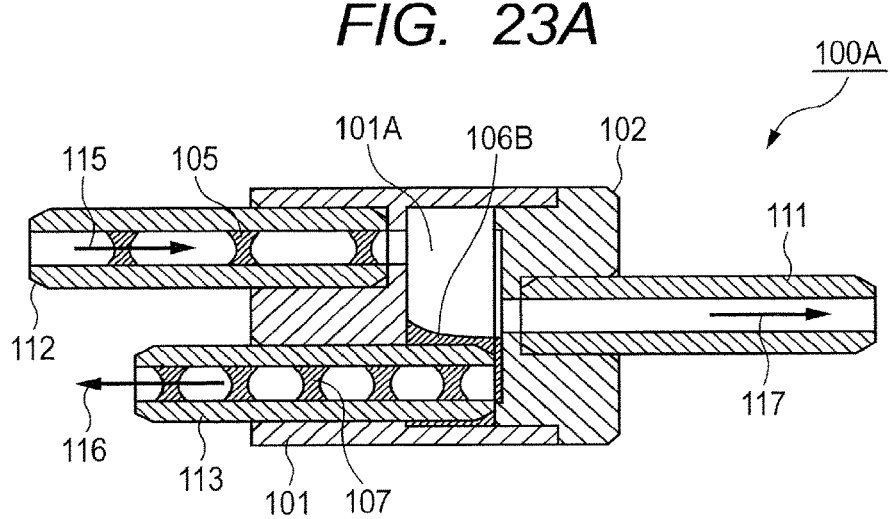
FIG. 23A is a view showing a liquid flow of each component of the gas-liquid separator of the first example in the state where the gas-liquid separator shown in FIG. 22A is rotated counterclockwise at 180°.
Figure 23B:
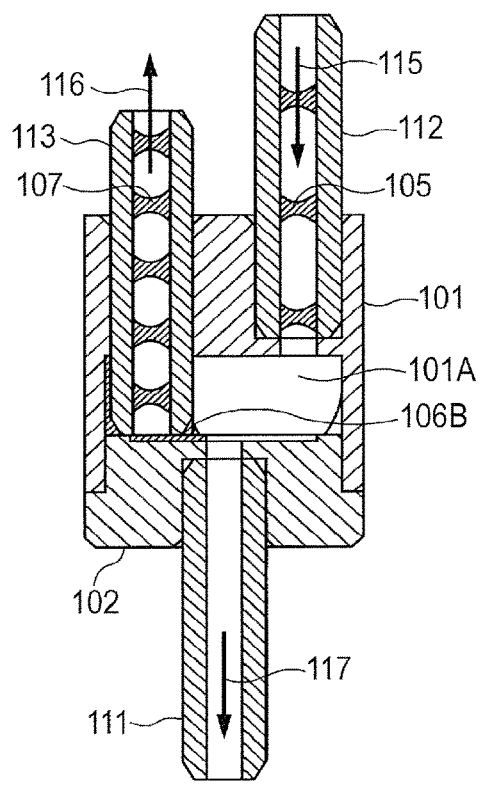
FIG. 23B is a view showing the state where the gas-liquid separator shown in FIG. 22A is rotated counterclockwise at 90°.
Figure 23C:
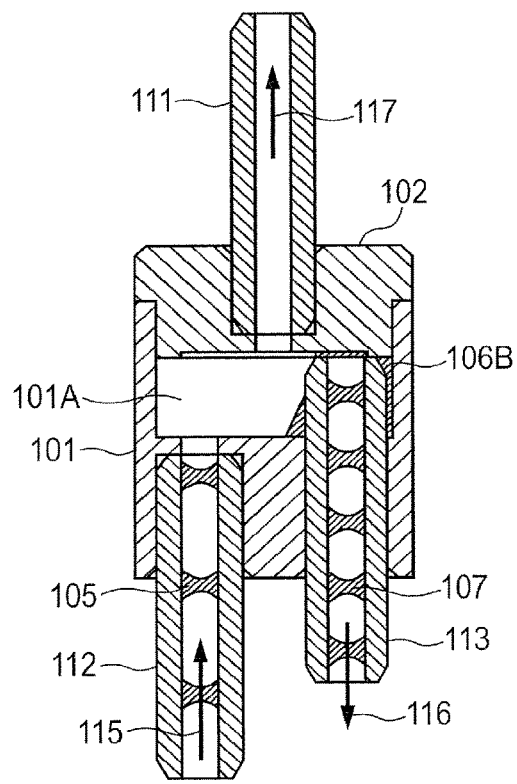
FIG. 23C is a view showing the state where the gas-liquid separator shown in FIG. 22A is rotated counterclockwise at 270°.

FIG. 23A illustrates liquid flows of the respective components of the gas-liquid separator 100A of the first example. FIG. 23A is a view obtained by rotating the view of FIG. 22A counterclockwise at 180°. FIG. 23B is a view obtained by rotating the view of FIG. 22A counterclockwise at 90°. FIG. 23C is a view obtained by rotating the view of FIG. 22A counterclockwise at 270°. As the drawings show, the gas-liquid separation may be performed in any direction. The gas-liquid separator 100 according to the present invention is unlikely to be influenced by gravity so as to perform gas-liquid separation irrespective of the set-up direction.

Figure 24A:
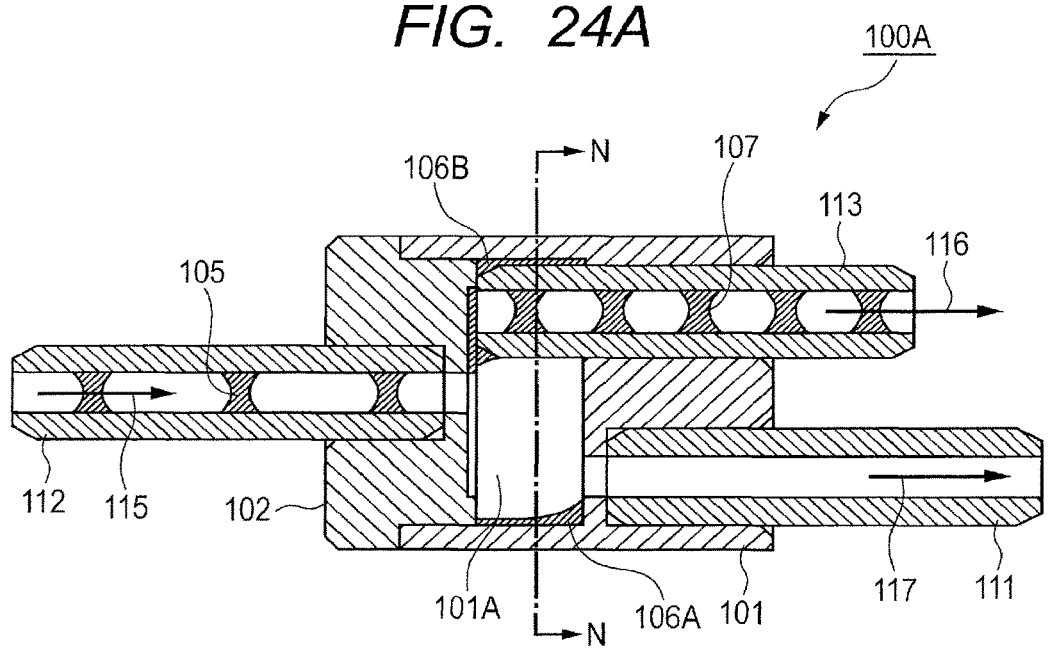
FIG. 24A is a view showing a liquid flow in response to change in the gas-liquid inlet of the gas-liquid separator of the first example.
Figure 24B:
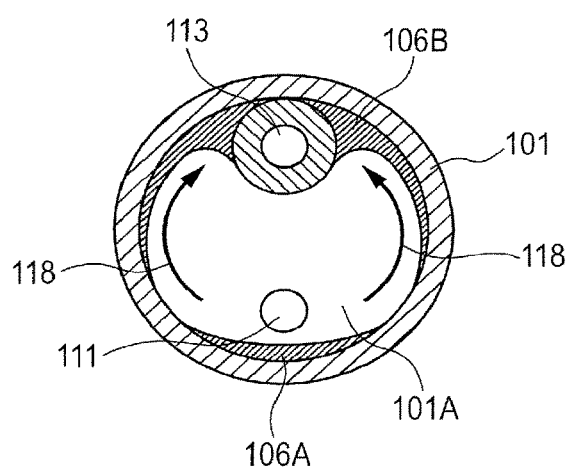
FIG. 24B is a view showing the liquid flow on a cross-section taken along line N-N of FIG. 24A.

Referring to FIGS. 24A and 24B, an explanation will be made with respect to operations of the gas-liquid separator in which positions of the gas-liquid 2-phase inlet pipe 112 and the gas outlet pipe 111 are interchangeable so that the gas-liquid 2-phase inlet pipe 112 is provided at the side of the casing 102. FIG. 24A is a view showing the inner structure and the gas-liquid flow of the gas-liquid separator 100A. FIG. 24B is a sectional view taken along line N-N of FIG. 24A showing the liquid flow. The mixture of gas and liquid 105 flows into the chamber 101A through the gas-liquid 2-phase inlet pipe 112 inserted into the casing 102 in the arrow direction of the gas-liquid inlet flow 115.

The gas-liquid 2-phase outlet pipe 113 inserted into the casing 101 recovers the liquid from the chamber 101A in the state where gas and the liquid 107 are mixed in an arrow direction of the gas-liquid recovery flow 116. The pump is provided at the secondary side of the gas-liquid 2-phase outlet pipe 113 under the suction force for separating the liquid 107 from gas for recovery. As the liquid 105 flowing through the gas-liquid 2-phase inlet pipe 112 flows into the chamber 101A, the liquid is temporarily accumulated at the lower part by gravity. The liquid 106A accumulated at the lower part is collected in the gap between the gas-liquid 2-phase outlet pipe 113 and the chamber 101A (101B, 1010 shown in FIG. 8) under the surface tension and suction force of the pipe 113 in the arrow direction of a liquid recovery flow 118 so that liquid 106B is collected. Thereafter, the liquid 106B is suctioned from the gas-liquid 2-phase outlet pipe 113. The liquid 106B in the chamber 101A may be suctioned by the gas-liquid 2-phase outlet pipe 113 so that the gas outlet pipe 111 inserted into the casing 101 discharges only gas from the chamber 101A in the arrow direction of the gas exhaust flow 117. The gas exhaust flow 117 is hardly mixed with the liquid 115, which allows gas to be discharged.

Figure 25A:
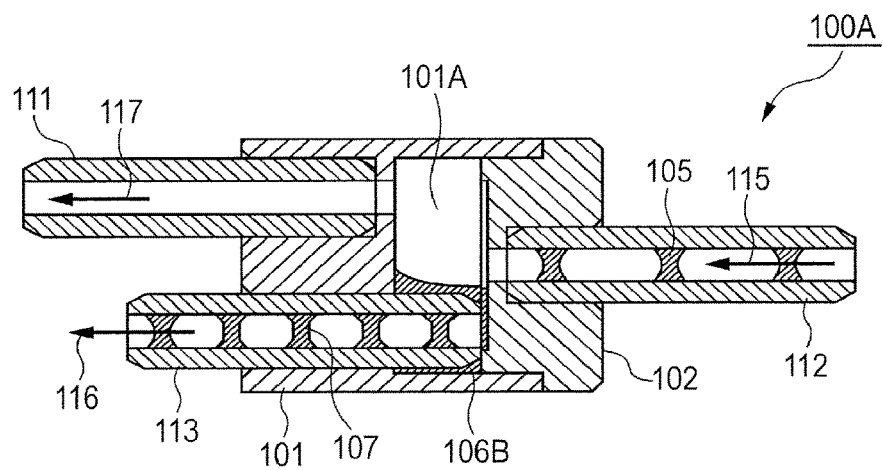
FIG. 25A is a view showing a liquid flow of the respective components in response to further change in the gas-liquid flow inlet of the gas-liquid separator of the first example in the state where the gas-liquid separator shown in FIG. 24A is rotated counterclockwise at 180°.
Figure 25B:
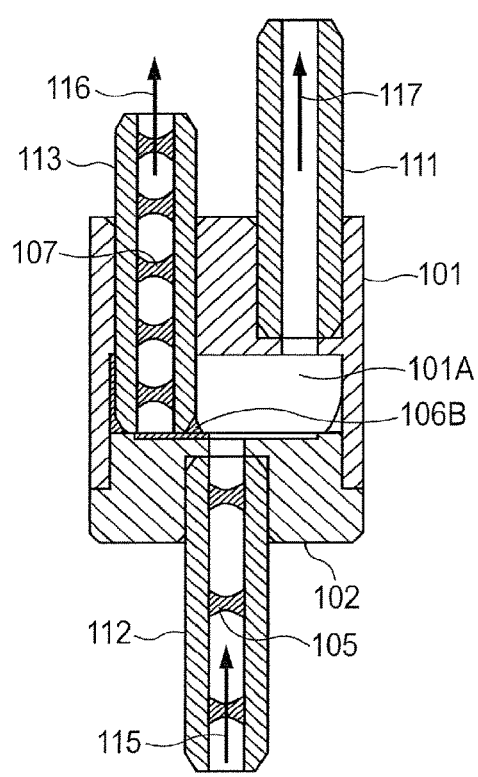
FIG. 25B is a view showing the state where the gas-liquid separator shown in FIG. 24A is rotated counterclockwise at 90°.
Figure 25C:
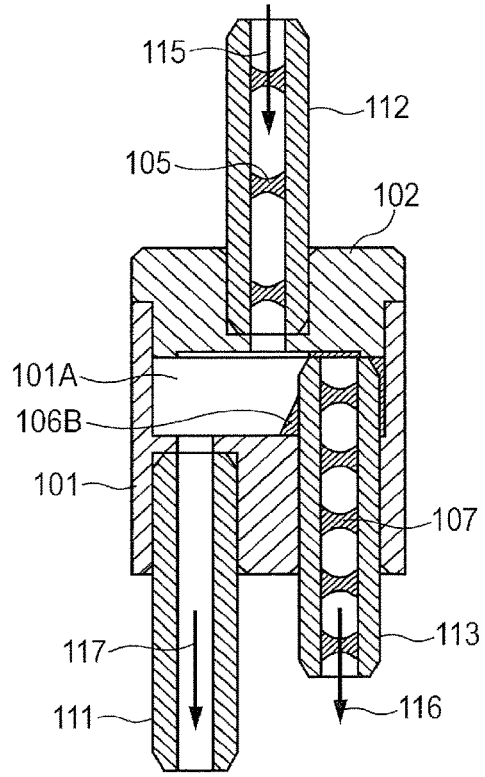
FIG. 25C is a view showing the state where the gas-liquid separator shown in FIG. 24A is rotated counterclockwise at 270°.

FIGS. 25A, 25B and 250 show the liquid flows of the components of the gas-liquid separator 100A of the first example. FIG. 25A is a view obtained by rotating the view of FIG. 24A counterclockwise at 180°. FIG. 25B is a view obtained by rotating the view of FIG. 24A counterclockwise at 90°. FIG. 25C is a view obtained by rotating the view of FIG. 24A counterclockwise at 270°. As the drawings show, the gas-liquid separation may be performed in any direction. The gas-liquid separator 100 according to the present invention is unlikely to be influenced, by gravity so as to ensure gas-liquid separation irrespective of the set-up direction as well as positions of the gas-liquid 2-phase inlet pipe 112 and the gas outlet pipe 111 inter-exchangeable.

Figure 26:
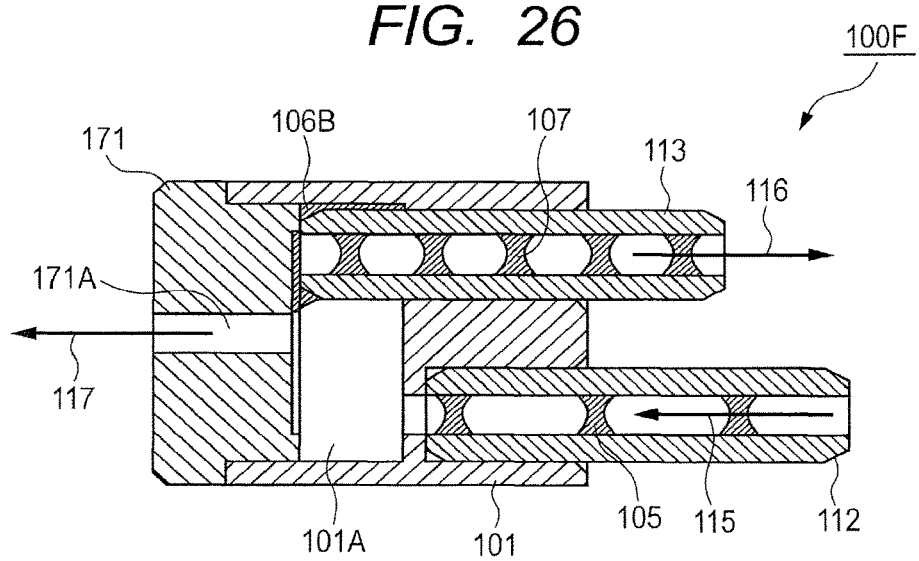
FIG. 26 is an overall sectional view showing a gas-liquid separator in another form of the first example.
Figure 27:
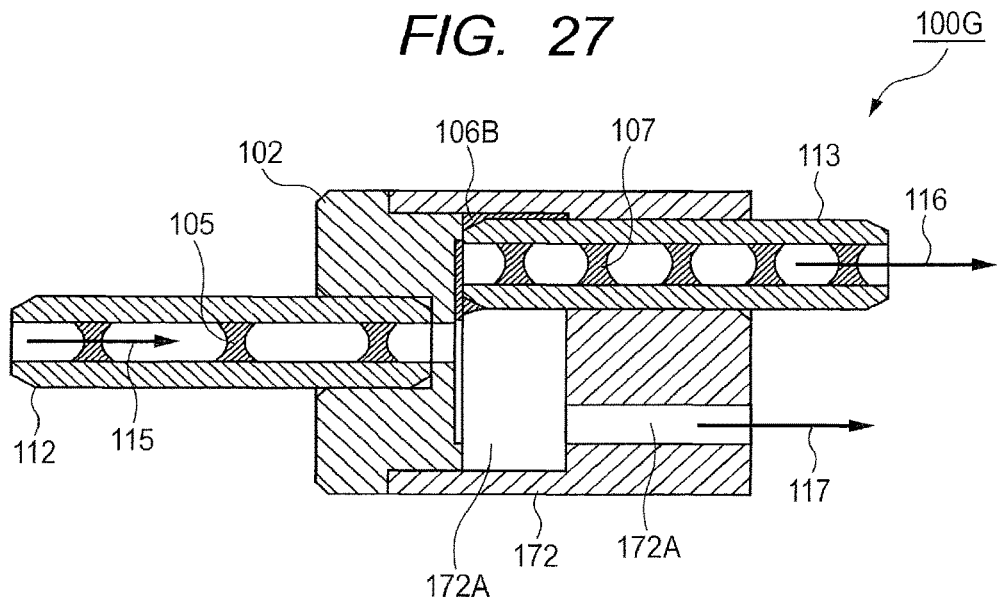
FIG. 27 is an overall sectional view showing a gas-liquid separator in still another form of the first example.

FIGS. 26 and 27 show another form of the gas-liquid separator 100A of the example. A gas-liquid separator 100F shown in FIG. 26 has a gas outlet 171A formed in a casing 171, and connected to the chamber 101A. The casing 171 is combined with the casing 101. The gas-liquid separator 100F discharges gas in the chamber 101A through the gas outlet 171A to the outside as indicated by the gas exhaust flow 117. A gas-liquid separator 100G shown in FIG. 27 has a gas outlet 172A formed in a casing 172, and connected to the chamber 101A. The casing 172 is combined with the casing 102. The gas-liquid separator 100G discharges gas in the chamber 101A through the gas outlet 171A as indicated by the gas exhaust flow 117. The separator may be configured as shown in FIGS. 26 and 27 in order not to discharge the liquid 105 to the outside.

According to the example, the gas-liquid separator is configured to allow one of the outlets to suction the liquid as most part of the fluid flowing as the gas-liquid mixture by separation and removal (or recovery), and the other outlet to discharge only the gas. As the flow formed by the surface tension and suction force is used, the set-up direction may be freely determined. This makes it possible to realize the separator with the simple structure.

The gas-liquid separator may have a compact structure, resulting in reduced set-up space. Furthermore, the gas-liquid separator may be simply configured, resulting in cost reduction. As it is capable of performing the gas-liquid separation irrespective of the set-up direction, the product (function) having its set-up position undeterminable may be used.

Second Example

Figure 9A:
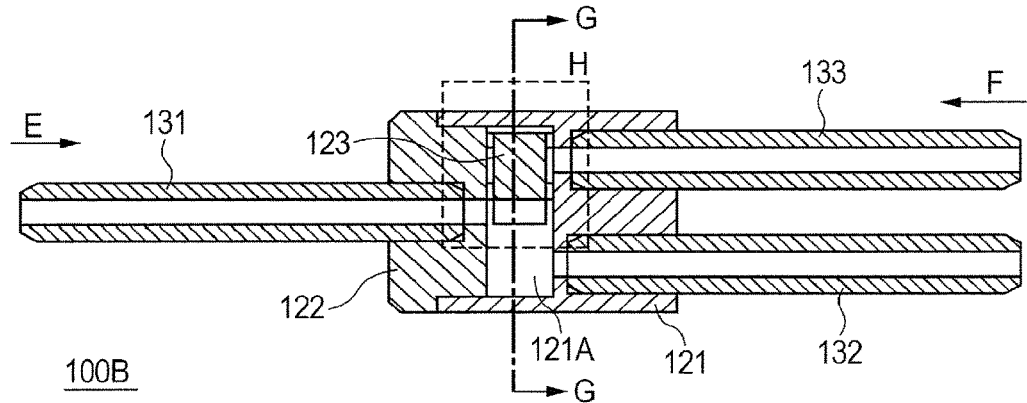
FIG. 9A is an overall sectional view showing a gas-liquid separator of a second example.
Figure 9B:
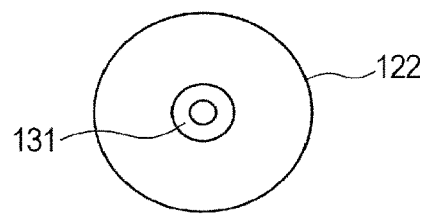
FIG. 9B is a view of FIG. 9A seen from a direction E.
Figure 9C:
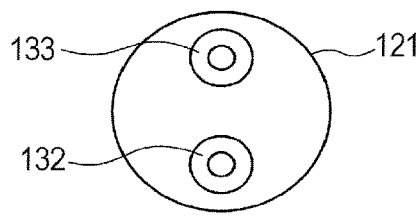
FIG. 9C is a view of FIG. 9A seen from a direction F.
Figure 9D:
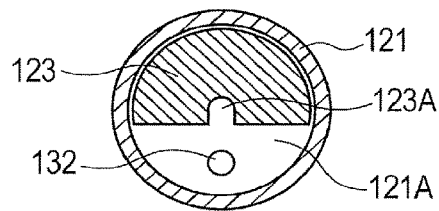
FIG. 9D is a sectional view of a chamber center taken along line G-G of FIG. 9A.
Figure 10:
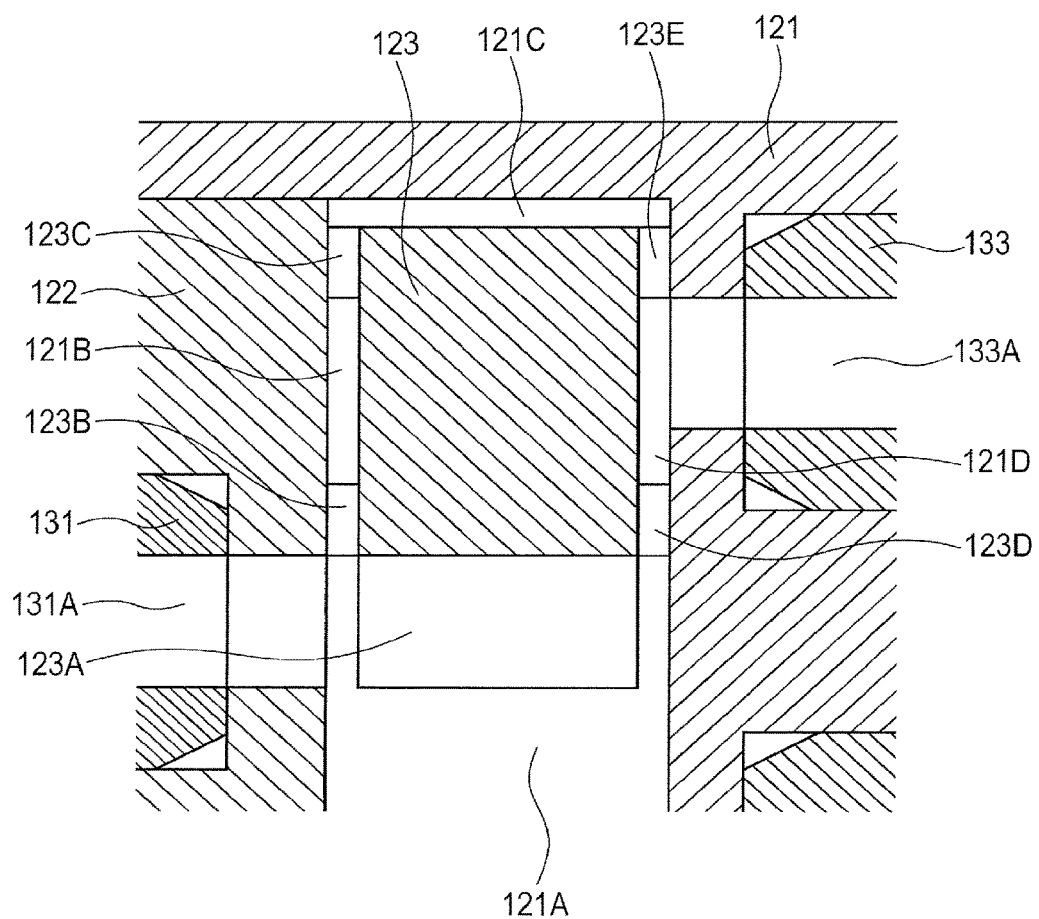
FIG. 10 is an enlarged view of a dotted frame H shown in FIG. 9A.

A second example according to the present invention will be described referring to FIGS. 9A to 9D, and 10. FIG. 9A is an overall sectional view of a gas-liquid separator 100B. FIG. 9B is a view of FIG. 920, seen from a direction E. FIG. 90 is a view of FIG. 9A seen from a direction F. FIG. 9D is a sectional view of the chamber center taken along line G-G of FIG. 9A. FIG. 10 is an enlarged view of a dotted frame H shown in FIG. 9A. Referring to FIG. 9A, a reference numeral 131 denotes a gas outlet pipe, 122 denotes a casing through which the gas outlet pipe 131 is inserted and fixed, 132 denotes a gas-liquid 2-phase inlet pipe, 133 denotes a gas-liquid outlet pipe, 121 denotes a casing through which the gas-liquid 2-phase inlet pipe 132 and the gas-liquid 2-phase outlet pipe 133 are inserted and fixed, 121A denotes a chamber, 123 denotes a block provided inside the chamber 121A. Use of the resin material for forming the block 123 allows easy manufacturing through molding.

When forming a gas-liquid separator 100B, the casings 122 and 121 are fitted and combined to form the enclosure, in which the cylindrical chamber 121A is formed. Then the semi-cylindrical block 123 is provided in the chamber 121A. The gas-liquid 2-phase inlet pipe 131 is inserted into the hole formed in the center of the cylindrical casing 122 on one end surface, and communicated with the chamber 121A. The gas-liquid 2-phase outlet pipe 133 and the gas-liquid 2-phase inlet pipe 132 are inserted to reach the position adjacent to the wall of the chamber 121A so as to be symmetrical with respect to the center point of the columnar casing 121 for communication. The block 123 is placed adjacent to the gas-liquid 2-phase outlet pipe 133 so as to define the gap therearound. The gap will be described referring to FIG. 10.

FIG. 9B is a view of FIG. 9A seen from the direction E. The gas outlet pipe 131 is provided at the center of the columnar casing 122. FIG. 9C is a view of FIG. 9A seen from the direction F, showing that the gas-liquid 2-phase outlet pipe 133 and the gas-liquid 2-phase inlet pipe 132 are arranged symmetrical with respect to the center of the casing 121. FIG. 9D is a sectional view taken along line G-G of FIG. 9A, showing that the semi-circular block 123 is provided adjacent to the gas-liquid 2-phase outlet pipe 133 inside the circular chamber 121A. The block 123 has a space 123A at its center so as not to interrupt passage of an inflow of the gas-liquid mixture from the gas-liquid 2-phase inlet pipe 132.

FIG. 10 is the enlarged view of a dotted frame H shown in FIG. 9A. Referring to FIG. 10, the enclosure is formed by fitting and combining the casing 122 through which the gas outlet pipe 131 is inserted and fixed, and the casing 121 through which the gas-liquid 2-phase outlet pipe 133 is inserted and fixed. A chamber 121A as the spatial area is formed in the enclosure. The block 123 is provided in the chamber 121A adjacent to the gas-liquid 2-phase outlet pipe 133. A gap 121B is formed between the block 123 and the inner wall of the casing 122, and a gap 121C is formed between the block 123 and the inner peripheral wall of the casing 121. Furthermore, a gap 121D is formed between the casing 121 and the block 123, at which the gas-liquid 2-phase outlet pipe 133 is inserted. Referring to FIG. 10, a reference numeral 131A denotes a hole of the gas outlet pipe, 133A denotes a hole of the gas-liquid 2-phase outlet pipe, and 123A denotes a space for the block 123. The gaps 123B, 123C, 123E and 123D are defined by the block 123 and the casing 121 to form a convex shape.

According to the example, use of the block 123 in the chamber 121A provides the gas-liquid separator which allows easy manufacturing of the component and reduction in manufacturing time as well as the manufacturing cost.

Third Example

Figure 11A:
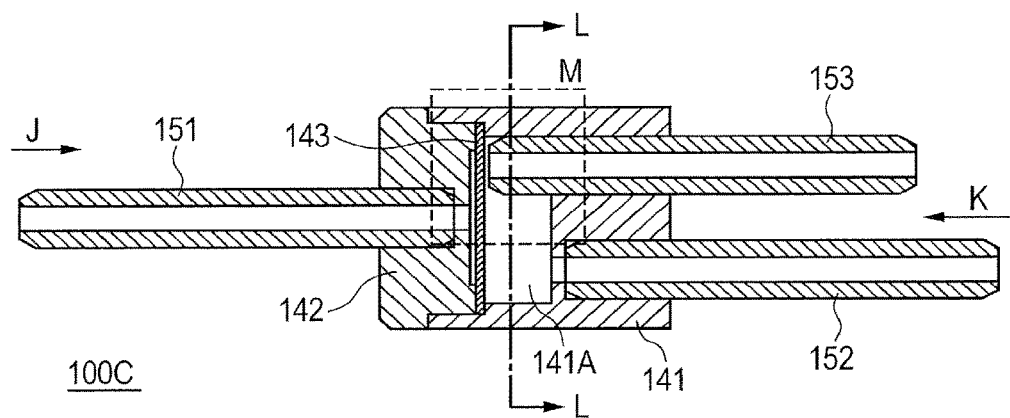
FIG. 11A is an overall sectional view showing a gas-liquid separator of a third example.
Figure 11B:
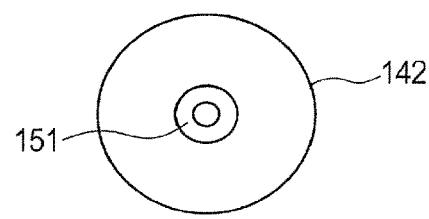
FIG. 11B is a view of FIG. 11A seen from a direction J.
Figure 11C:
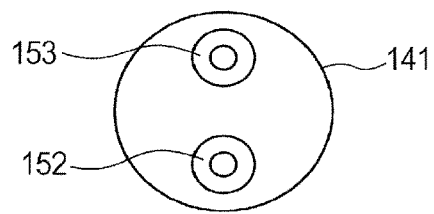
FIG. 11C is a view of FIG. 11A seen from a direction K.
Figure 11D:
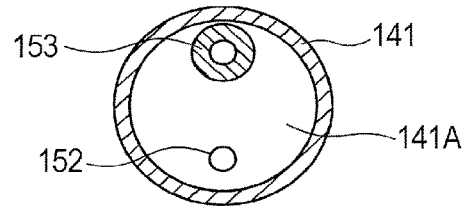
FIG. 11D is a sectional view of a chamber center taken along line L-L of FIG. 11A.
Figure 12:
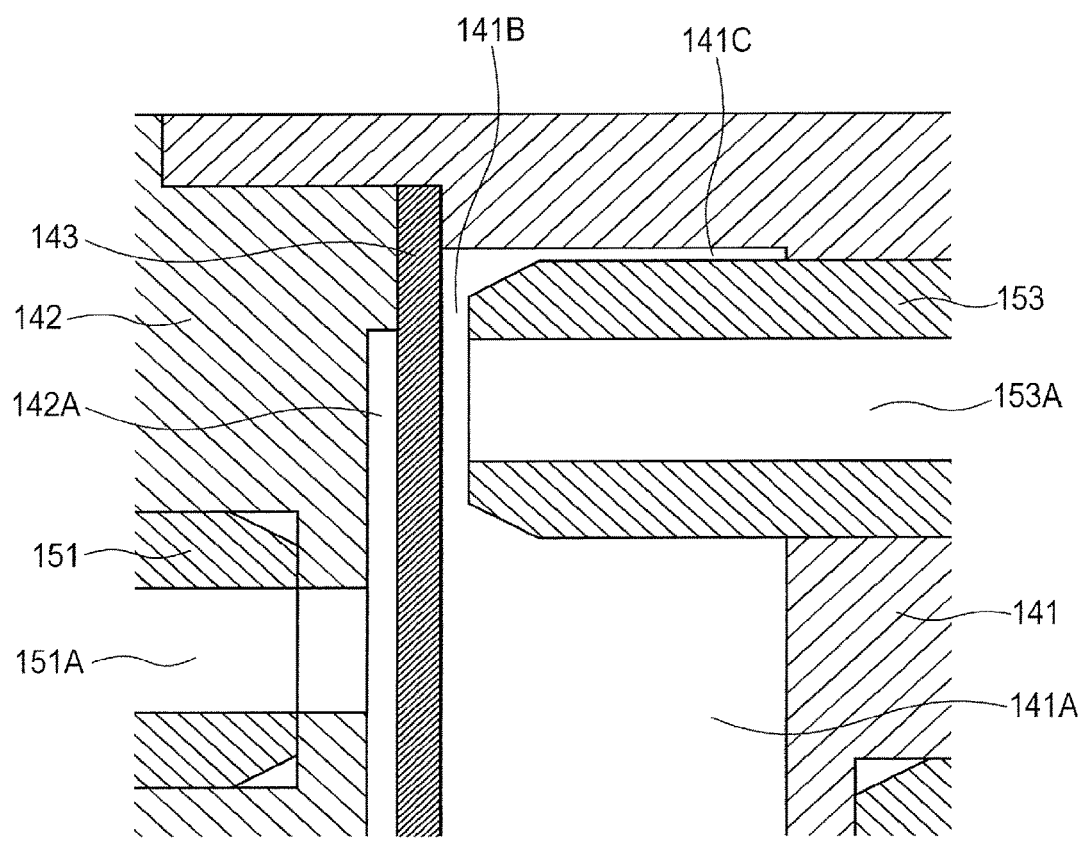
FIG. 12 is an enlarged view of a dotted frame M shown in FIG. 11A.

A third example according to the present invention will be described referring to FIGS. 11A to 11D, and 12. FIG. 11A is an overall sectional view of a gas-liquid separator 100C. FIG. 11B is a view of FIG. 11A seen from a direction J. FIG. 11C is a view of FIG. 11A seen from a direction K. FIG. 11D is a sectional view of the chamber center taken along line L-L of FIG. 11A. FIG. 12 is an enlarged view of a dotted frame M of FIG. 11A. Referring to FIG. 11A, a reference numeral 151 denotes a gas-liquid 2-phase inlet pipe, 152 denotes a gas outlet pipe, 153 denotes a gas-liquid 2-phase outlet pipe, 142 denotes a casing through which the gas-liquid 2-phase inlet pipe is inserted and fixed, 141 denotes a casing through which the gas outlet pipe 152 and the gas-liquid 2-phase outlet pipe 153 are inserted and fixed, and 143 denotes a porous plate provided in the chamber 141A. When forming the gas-liquid separator 100C, the casings 142 and 141 are fit and combined to form the enclosure so that the cylindrical chamber 141A is formed inside the enclosure. The porous plate 143 is provided in the chamber 141A having a gap from the wall of the casing 142. The gas-liquid inlet pipe 151 is inserted from the center of one end surface of the cylindrical casing 142, and fixed so as to be communicated with the chamber 141A. The gas-liquid 2-phase outlet pipe 153 is inserted to the chamber 141A, and fixed. The gas outlet pipe 152 is inserted to the chamber 141A, and fixed. Those pipes are communicated with each other.

FIG. 11B is a view of FIG. 11A seen from the direction J, showing the gas-liquid 2-phase inlet pipe 151 provided in the center of the casing 142. FIG. 11C is a view of FIG. 11A seen from the direction K, showing that the gas-liquid 2-phase outlet pipe 153 and the gas outlet pipe 152 are symmetrically arranged with respect to the center of the casing 141. FIG. 11D is a sectional view taken along line L-L of FIG. 11A, showing the gap between the gas-liquid 2-phase outlet pipe 153 protruding into the cylindrical chamber 141A and the inner peripheral wall of the casing 141.

FIG. 12 is an enlarged view of the dotted frame M shown in FIG. 11A. Referring to FIG. 12, the casing 142 through which the gas-liquid 2-phase inlet pipe 151 is inserted and fixed, and the casing 141 through which the gas-liquid 2-phase outlet pipe 153 is inserted and fixed are fit and combined to form the enclosure. The spatial area as the chamber 141A is formed in the enclosure, and the porous plate 143 is provided in the chamber 141A at the side of the casing 142. The recess portion is formed to have a gap 142A between the casing 142 and the porous plate 143. A gap 141B is also formed between the porous plate 143 and the gas-liquid 2-phase outlet pipe 153, and a gap 141C is formed between the gas-liquid 2-phase outlet pipe 153 and the casing 141. Those gaps make it possible to facilitate the gas-liquid mixture to be discharged from the gas-liquid 2-phase outlet pipe 153 using the surface tension of the liquid and suction flow. The gas-liquid separator 100C has the porous plate 143 between the gas-liquid 2-phase inlet pipe 151 and the chamber 141A.

According to the example, when there is an inflow of the ink mist together with the liquid, the ink mist is captured once, so that the ink mist is dissolved with the liquid that is about to flow into the chamber 141A. This makes it possible to suction the ink mist together with the liquid from the gas-liquid 2-phase outlet pipe 153, resulting in the reduced ink mist discharged from the gas outlet pipe 152.

Fourth Example

Figure 13A:
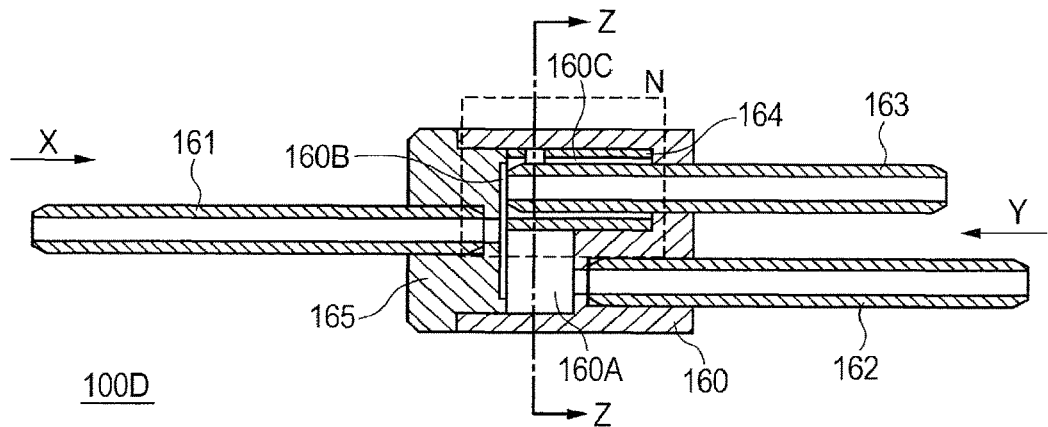
FIG. 13A is an overall sectional view showing the gas-liquid separator of a fourth example.
Figure 13B:
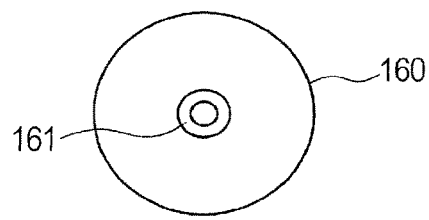
FIG. 13B is a view of FIG. 13A seen from a direction X.
Figure 13C:
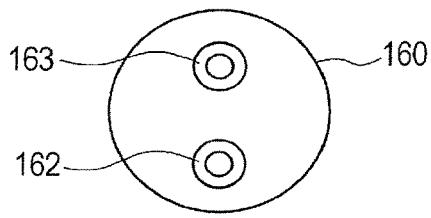
FIG. 13C is a view of FIG. 13A seen from a direction Y.
Figure 13D:
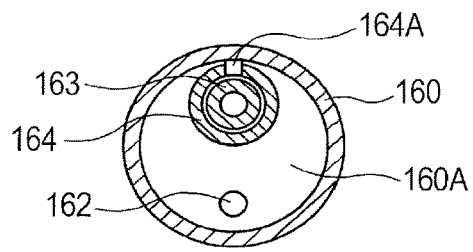
FIG. 13D is a sectional view of a chamber center taken along line Z-Z of FIG. 13A.
Figure 14:
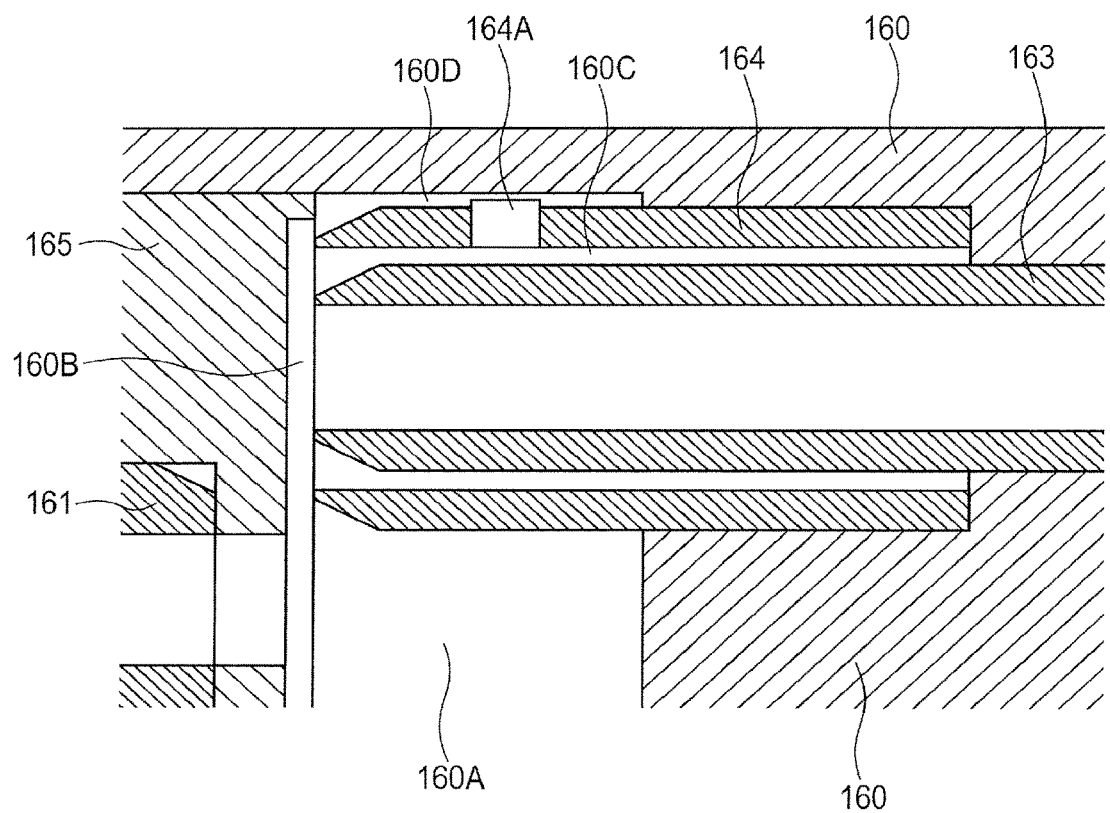
FIG. 14 is an enlarged view of a dotted frame N shown in FIG. 13A.

A fourth example according to the present invention will be described referring to FIGS. 13A to 13D and 14. FIG. 13A is an overall sectional view of a gas-liquid separator 100D. FIG. 13B is a view of FIG. 13A seen from a direction X. FIG. 13C is a view of FIG. 13A seen from a direction Y. FIG. 13D is a sectional view of the chamber center taken along line Z-Z of FIG. 13A. FIG. 14 is an enlarged view of a dotted frame N of FIG. 13A. Referring to FIG. 13A, a reference numeral 161 denotes a gas outlet pipe, 162 denotes a gas-liquid 2-phase inlet pipe, 163 denotes a gas-liquid 2-phase outlet pipe, 165 denotes a casing through which the gas outlet pipe is inserted and fixed, 160 denotes a casing through which the gas-liquid 2-phase inlet pipe 162 and the gas-liquid 2-phase outlet pipe 163 are inserted and fixed, and 164 denotes an outer pipe having the double-layered gas-liquid 2-phase outlet pipe 163. The gas-liquid separator 100D is configured to form the enclosure by fitting and combining the casings 165 and 160. A cylindrical chamber 160A is formed inside the enclosure. The gas-liquid 2-phase outlet pipe 163 has a double-layered top end part so as to protrude to the chamber 160A, and is fixed. The double-layered structure is formed from the top end of the gas-liquid 2-phase outlet pipe 163 to the middle position of the casing 160. The gas-liquid 2-phase inlet pipe 162 is inserted to the chamber 160A for communication therewith.

FIG. 13B is a view of FIG. 13A seen from the direction X, showing the gas outlet pipe 161 at the center of the casing 165. FIG. 13C is a view of FIG. 13A seen from the direction Y, showing that the gas-liquid 2-phase outlet pipe 163 and the gas outlet pipe 162 are symmetrically arranged with respect to the center of the casing 160. FIG. 13D is a sectional view taken along line Z-Z of FIG. 13A, showing that the gap is formed between the double-layered gas-liquid 2-phase outlet pipe 163 protruding into the cylindrical chamber 160A and the inner peripheral wall of the casing 160.

FIG. 14 is an enlarged view of a dotted frame N of FIG. 13A. Referring to FIG. 14, the enclosure is formed by fitting and combining the casing 165 through which the gas outlet pipe 161 is inserted and fixed, and the casing 160 through which the gas-liquid 2-phase outlet pipe 163 is inserted and fixed. The spatial area as the chamber 160A is formed in the enclosure, and the gas-liquid 2-phase outlet pipe 163 is double-layered by providing a pipe 164 on the outer periphery. Therefore, a gap 160C is formed between the gas-liquid 2-phase outlet pipe 163 and the pipe 164 at the outer side. A gap 160D is formed between the outer pipe of the double-layered structure and the inner peripheral wall of the casing 160. The outer pipe 164 of the double-layered structure may have a hole 164A formed at the outer wall side of the chamber 160A. It is possible to facilitate suction of the liquid accumulated in the gap 160D from the gas-liquid 2-phase outlet pipe 163 through the hole 164A. The recess portion is formed to have the gap 160B between the casing 165 and the gas-liquid 2-phase outlet pipe 163. According to the example, the gaps are formed around the gas-liquid 2-phase outlet pipe 163 so as to facilitate discharge of the liquid from the gas-liquid 2-phase outlet pipe 153 using the surface tension of the liquid and the suction flow.

Fifth Example

Figure 15:
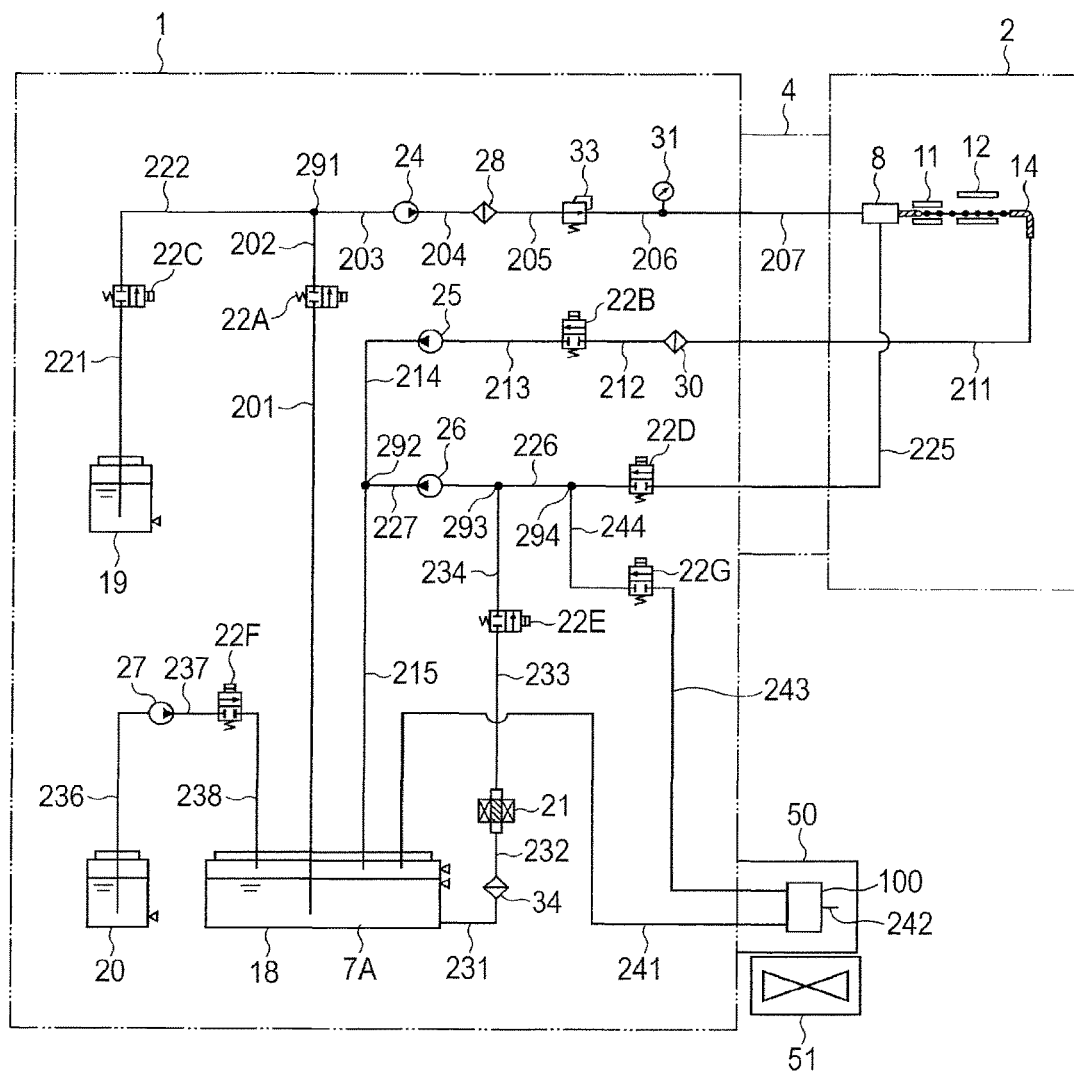
FIG. 15 is a view showing a path structure of an inkjet recording apparatus of a fifth example.

Referring to FIG. 15, a path structure of an inkjet recording apparatus will be described as a fifth example according to the present invention. FIG. 15 is a view showing a general path structure of an inkjet recording apparatus 400. The inkjet recording apparatus 400 includes the main body 1, the print head 2, and the cable 4 for connecting the main body 1 and the print head 2. As the gas-liquid separator 100 provided in the main body 1, an any gas-liquid separator may be used by selecting from the gas-liquid separator 100A described in the first example, the gas-liquid separator 100B described in the second example, the gas-liquid separator 100C described in the third example, and the gas-liquid separator 100D described in the fourth example.

An ink supply path of the inkjet recording apparatus shown in FIG. 15 will be described. The ink supply path of the inkjet recording apparatus 400 of the example will be described. The main body 1 is provided with the main ink container 18 which stores circulating ink 7A. The main ink container 18 is provided with a level sensor 38 which detects whether or not the liquid in the main ink container 18 reaches the reference liquid level indicating the appropriate amount for holding the liquid inside.

The main ink container 18 is connected to a solenoid valve 22A for opening and closing the path via a path 201. The solenoid valve 22A is connected to a junction path 291 via a path 202. The junction path 291 is connected to a pump (for supply) 24 used for suction and pressure feed of the ink 7A via a path 203. The pump (for supply) 24 is connected to a filter (for supply) 28 which removes a foreign substance mixed in the ink 7A via a path 204.

The filter 28 is connected to a reducing valve 33 which adjusts the pressure appropriately for printing the ink 7A that has been pressure fed from the pump (for supply) 24 via a path 205. The reducing valve 33 is provided with a pressure sensor 31 for measuring the pressure of the ink 7A supplied to the nozzle via a path 206. The pressure sensor 31 is provided in the print head 2 via a path 207 passing through the cable 4, and is connected to the nozzle 8 having a discharge port for discharging the ink 7A. The gutter 14 is provided in the straight advancing direction of the discharge port of the nozzle 8 for capturing the straightly flying particle 7C unused for printing without being charged nor deflected.

An ink recovery path of the inkjet recording apparatus 400 according to the example will be described referring to FIG. 15. The gutter 14 is connected to a filter (for recovery) 30 provided in the main body 1 via a path 211 passing through the cable 4 for removing the foreign substance mixed in the ink. The filter (for recovery) 30 is connected to the solenoid valve 22B for opening and closing the path via the path 212. The solenoid valve 22B is connected to a pump (for recovery) 25 that suctions the ink particle 7C captured by the gutter 14 via the path 213. The pump (for recovery) 25 is connected to a junction path 292 via the path 214. The junction path 292 is connected to the main ink container 18 via a path 215.

Then an ink supply path will be described referring to FIG. 15. The main body 1 is provided with an auxiliary ink container 19 that stores ink for replenishment. The auxiliary ink container 19 is connected to a solenoid valve 22C for opening and closing the path via a path 221. The solenoid valve 22C is connected to the junction path 291 via a path 222.

An ink circulation path will be described referring to FIG. 15. The nozzle 8 in the print head 2 is provided in the main body 1 via a path 225 passing through the cable 4 besides the path 207 for ink supply, and is connected to a solenoid valve 22D for opening and closing a flow channel. The solenoid valve 22D is connected to a pump (for circulation) 26 for suctioning the ink from the nozzle 8 via a path 226. The pump (for circulation) 26 is connected to the junction path 292 via a path 227.

An ink viscosity measurement path will be described referring to FIG. 15. A viscometer 21 is provided for the purpose of obtaining the viscosity of the ink 7A in the main ink container 18. The flow channel of the viscometer 21 at the primary side is connected to a filter (for measuring viscosity) 34 which removes the foreign substance mixed in the ink 7A via a path 232. The filter (for measuring viscosity) 34 is connected to the main ink container 18 via a path 231. The flow channel of the viscometer 21 at the secondary side is connected to a solenoid valve 22E for opening and closing the flow channel via a path 233. The solenoid value 22E is connected to a junction path 293 that joins with the path 226 via a path 234.

Then a solvent supply path of the inkjet recording apparatus will be described referring to FIG. 15. The main body 1 is provided with a solvent container 20 for storing the solvent for supply. The solvent container 20 is connected to a pump (for solvent) 27 used for suction and pressure feeding of the solvent via a path 236. The pump (for solvent) 27 is connected to a solenoid valve 22F for opening and closing the flow channel via a path 237. The solenoid valve 22F is connected to the main ink container 18 via a path 238.

An exhaust path and a liquid recovery path of the ink recording apparatus will be described referring to FIG. 15. The main ink container 18 is connected to the gas-liquid separator 100 provided in the main body 1 via a path 241. The gas-liquid 2-phase outlet pipe of the gas-liquid separator 100 is connected to a solenoid valve 22G for opening and closing the flow channel via a path 243. The solenoid valve 22G is connected to a junction path 294 which joins with the path 226 via a path 244. A gas outlet of the gas-liquid separator 100 is connected to the inside of an exhaust cable 50 installed in the main body 1. For example, the gas-liquid separator 100 is provided inside the exhaust cable 50 provided outside the apparatus according to the example. However, it is not limited to the aforementioned example. Preferably, the gas-liquid separator 100 is provided at the location unlikely to be influenced by the temperature rise in the main body 1 as low degree as possible. For example, the solvent recovery amount may be increased by air cooling the gas-liquid separator 100 and the path 241 using a fan 51.

Figure 28:
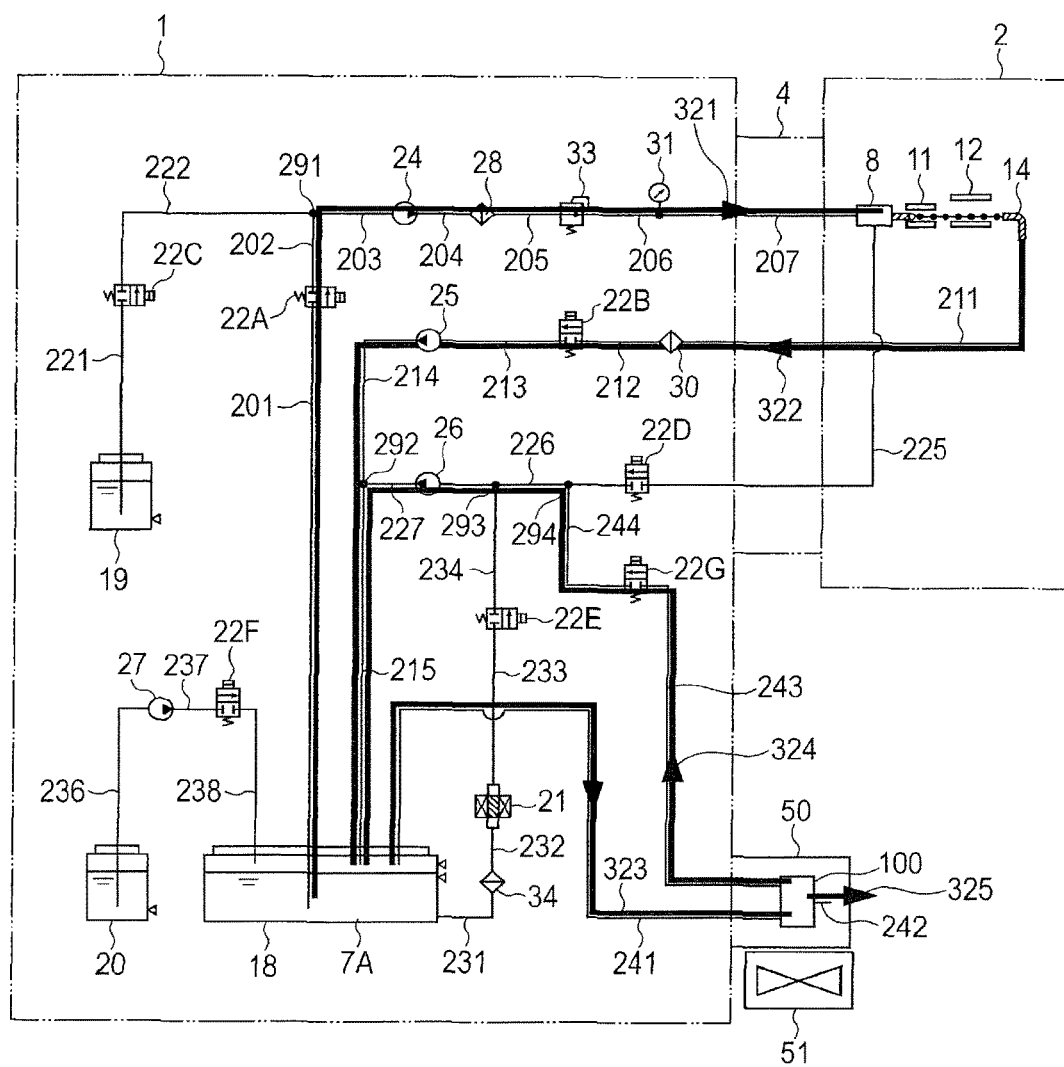
FIG. 28 is a view showing fluid paths of the ink, air and solvent in bold lines during the printing operation according to the fifth example.

A fifth example of the operational behavior of the inkjet recording apparatus 400 according to the present invention will be described. FIG. 28 is a view showing a fluid path indicating the ink flow and the air flow in bold lines of the inkjet recording apparatus 400 of the example during the printing operation (ejecting the ink from the nozzle 8). During the printing operation, electricity is applied to the solenoid valve 22A to open the flow channel. As an ink supply flow 321 shows, the ink 7A stored in the main ink container 18 is supplied to the nozzle 8 by operating the pump (for supply) 24. The flow rate of the ink on the ink supply flow 321 is approximately 3.5 ml/m assuming that the bore of the nozzle 8 is 65 μm, and the pressure of the ink supplied to the nozzle 8 is 0.250 MPa.

On the ink recovery path, electricity is applied to the solenoid valve 22B to open the flow channel. As an ink recovery flow 322 shows, the ink particle 7C unused for printing is recovered from the gutter 14 into the main ink container 18 by operating the pump (for recovery) 25 so as to circulate the ink in the apparatus. On the ink recovery flow 322, if the flow rate of the ink particle 7C discharged from the nozzle 8 is approximately 3.5 ml/m, and the flow rate of the ink particle used for the printing is 0.5 ml/m, the difference between those flow rates, that is, approximately 3.0 ml/m (=3.5−0.5) is recovered from the gutter 14. On the ink recovery flow 322, air suctioned together with the ink from the gutter 14 is flowing as the path 211 for connecting the gutter 14 in the print head 2 and the pump (for recovery) 25 in the main body 1 has the length of approximately 4 m. This structure may increase the load when trying to suction the ink only, and the ink without being suctioned overflows from the gutter 14. For this, when suctioning the ink from the gutter 14, air is suctioned by approximately 150 ml/m. That is, on the ink recovery flow 322, the ink (for example, approximately 3.0 ml/m) and air (for example, approximately 150 ml/m) flow on the ink recovery flow 322 in the gas-liquid mixture state.

The ink 7A used for the inkjet recording apparatus 400 is required to be dried immediately after the printing. Therefore, the solvent with high volatility (for example, methyl ethyl ketone, acetone, ethanol) is used as the solvent for the ink 7A. As the high volatile solvent is used for forming the ink 7A, air flowing on the ink recovery flow 322 has the solvent vapor nearly to the saturated vapor concentration dissolved. The solvent vapor is dissolved in the air in accordance with the temperature of the main ink container 18 by the temperature rise of the main body 1.

Next, a solvent gas circulation flow 323, a liquid recovery flow 324, and an exhaust flow 325 will be described referring to FIG. 28. On the liquid recovery path, electricity is applied to the solenoid valve 22G to open the flow channel. On the liquid recovery flow 324, the gas-liquid mixture including the liquid and saturated solvent vapor is flowing. The liquid flows at the flow rate of approximately 2.5 ml/h (environmental temperature: 20° C.), and the solvent vapor flows at the flow rate of approximately 80 ml/m.

The main ink container 18 is configured to allow inflow of the ink flowing through the ink recovery flow 322 and the liquid flowing through a liquid recovery flow 324 so as to be stored. After inflow of a total sum of the solvent vapor by combining the solvent vapor flowing at approximately 150 ml/m on the ink recovery flow 322 and the solvent vapor flowing at approximately 80 ml/m on the ink recovery flow 324, that is, approximately 230 ml/m (=150+80), the flow passes through the path 241 as the solvent gas circulation flow 323 shows, and flows into the gas-liquid separator 100. It is assumed that the solvent vapor at 230 ml/m flows into the gas-liquid separator 100 while the solvent vapor partially liquefied (approximately 2.5 ml/h) owing to the temperature difference (on the assumption that the environmental temperature is 20° C.). As the gas-liquid separator 100 is capable of suctioning the liquid from liquid recovery path 243, the path 242 discharges the gas (solvent gas at flow rate of 150 ml/m) to the outside of the apparatus. This is shown as an exhaust flow 325 in the drawing.

Figure 29:
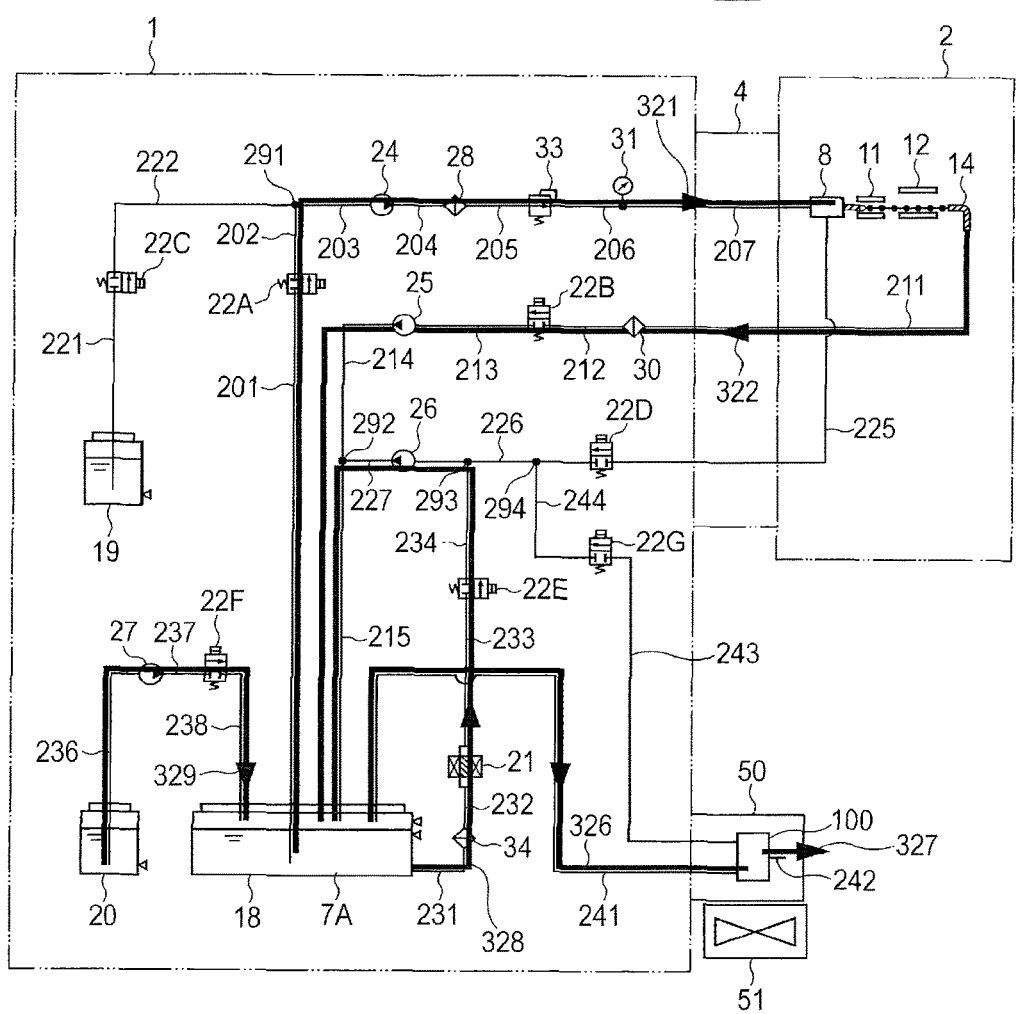
FIG. 29 is a view showing fluid paths of the ink, air and solvent in the bold lines during the viscosity measurement or the solvent supply according to the fifth example.

FIG. 29 is a view showing a fluid path indicating the ink flow, air flow and solvent flow in bold lines obtained when the viscosity is measured and the solvent is supplied in the inkjet recording apparatus 400 according to the example. Explanations of the ink supply flow 321 and the ink recovery flow 322 which are the same as those shown in FIG. 28 will be omitted.

Referring to FIG. 29, the solvent gas flowing into the main ink container 18 from the ink recovery flow 322 is discharged from the gas-liquid separator 100 into the exhaust cable 50 as exhaust flows 326 and 327 show, and further discharged to the outside of the apparatus. During the viscosity measurement, electricity is applied to the solenoid valve 225 to open the flow channel. As a viscosity measurement ink flow 328 shows, the ink 7A stored in the main ink container 18 is supplied to the viscometer 21 by operating the pump (for circulation) 26. The above-described operation allows different use of the pump (for circulation) 27 dependent on the liquid recovery flow 324 and the viscosity measurement ink flow 328.

The density of the ink in the main ink container 18 is increased in proportion to the volatile portions of the solvent in the ink on the ink recovery flow 322. For this, the solvent is regularly supplied to the main ink container 18 so as to adjust the density of the ink to be supplied to the nozzle 8. During supply of the solvent, electricity is applied to the solenoid valve 22F to open the flow channel as indicated by a solvent supply flow 329. The solvent stored in the solvent container 20 is supplied to the main ink container 18 by operating the pump (for solvent) 27.

Figure 16:
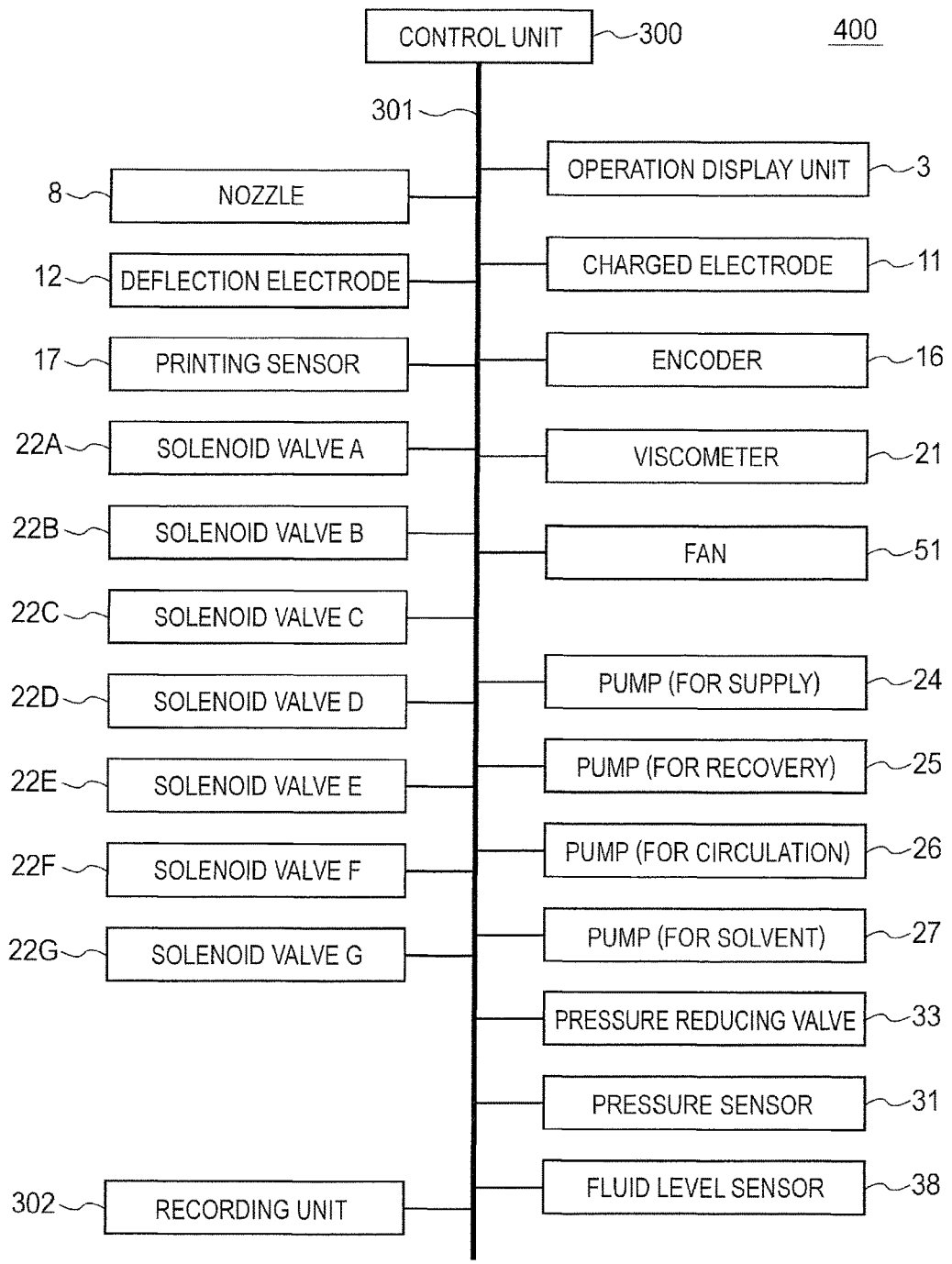
FIG. 16 is a functional block diagram of the inkjet recording apparatus shown in FIG. 15.

FIG. 16 is a functional block diagram of the inkjet recording apparatus 400 shown in FIG. 15. Referring to FIG. 16, the inkjet recording apparatus 400 is provided with a control unit 300 with an MPU, for example. The control unit 300 is configured to control respective components including the operation display unit 3, the nozzle 8, the charged electrode 11, the deflection electrode 12, the encoder 16, the printing sensor 17, the viscometer 21, the solenoid valves 22A to 22G, the pressure reducing valve 33, a fluid level sensor 38 and a recording unit 302 via a bus line 301. The recording unit 302 stores the program for controlling the inkjet recording apparatus 400. The control unit 300 is configured to control the respective components that constitute the inkjet recording apparatus 400 based on the program. The recording unit 302 records the appropriate ink viscosity for printing, that is, upper limit value ($\eta$ max) and a lower limit value ($\eta$ min) for printing.

The inkjet recording apparatus is required to control the viscosity of the ink discharged from the nozzle in the range that allows appropriate printing operation. If the ink viscosity deviates from the appropriate range, the position at which the ink discharged from the nozzle is atomized is changed, and the phenomenon that the ink particles cannot be uniformly shaped. This may fail to apply desired amount of electric charge to the ink particle, resulting in inappropriate printed result. In order to avoid the aforementioned phenomena, the inkjet recording apparatus requires means for adjusting the ink viscosity and keeping the viscosity of the ink in a predetermined range.

Assuming that a generally employed inkjet recording apparatus (air suction amount from the gutter 14 is 150 ml/m, and an inner temperature rise of the main body at the ambient temperature is +8° C.) under condition of the ambient temperature at 20° C., the solvent consumption in operation is approximately 5 ml/h. Meanwhile, the inkjet recording apparatus 400 as the fifth example according to the present invention is capable of easily suppressing the temperature of the solvent gas passing through the gas-liquid separator 100 to the value expressed by the ambient temperature+2° C. At the ambient temperature of 20° C., the solvent component volatilized in the main ink container 18 (temperature rise+8° C., that is, at 28° C.) in the main body 1 is cooled while passing through the path 141 to the temperature in the gas-liquid separator (ambient temperature+2° C., that is, 22° C.). The difference between the temperature of the main ink container 18 and the temperature of the gas-liquid separator 100 is 6° C. (=28° C.−22° C.). Therefore, approximately 1.5 ml/h of the solvent is liquefied. The liquefied solvent passes through the path 243 from the gas-liquid, separator 100 to return to the main ink container 18 while passing through the path 243. The inkjet recording apparatus 400 according to the present invention is capable of suppressing the solvent consumption in operation to approximately 3.5 ml/h (5 ml/h (related art)−1.5 ml/h (recovery amount)).

As described above, the inkjet recording apparatus of the example reduces the solvent consumption for the purpose of decreasing the running cost of the customer. The discharge of the solvent gas from the main body is reduced for the purpose of improving the work environment of the customer. The inkjet recording apparatus of the example reduces the discharge of the liquid 105 to the outside of the apparatus to ensure that the area around the inkjet recording apparatus is kept clean in use.

Sixth Example

Figure 17:
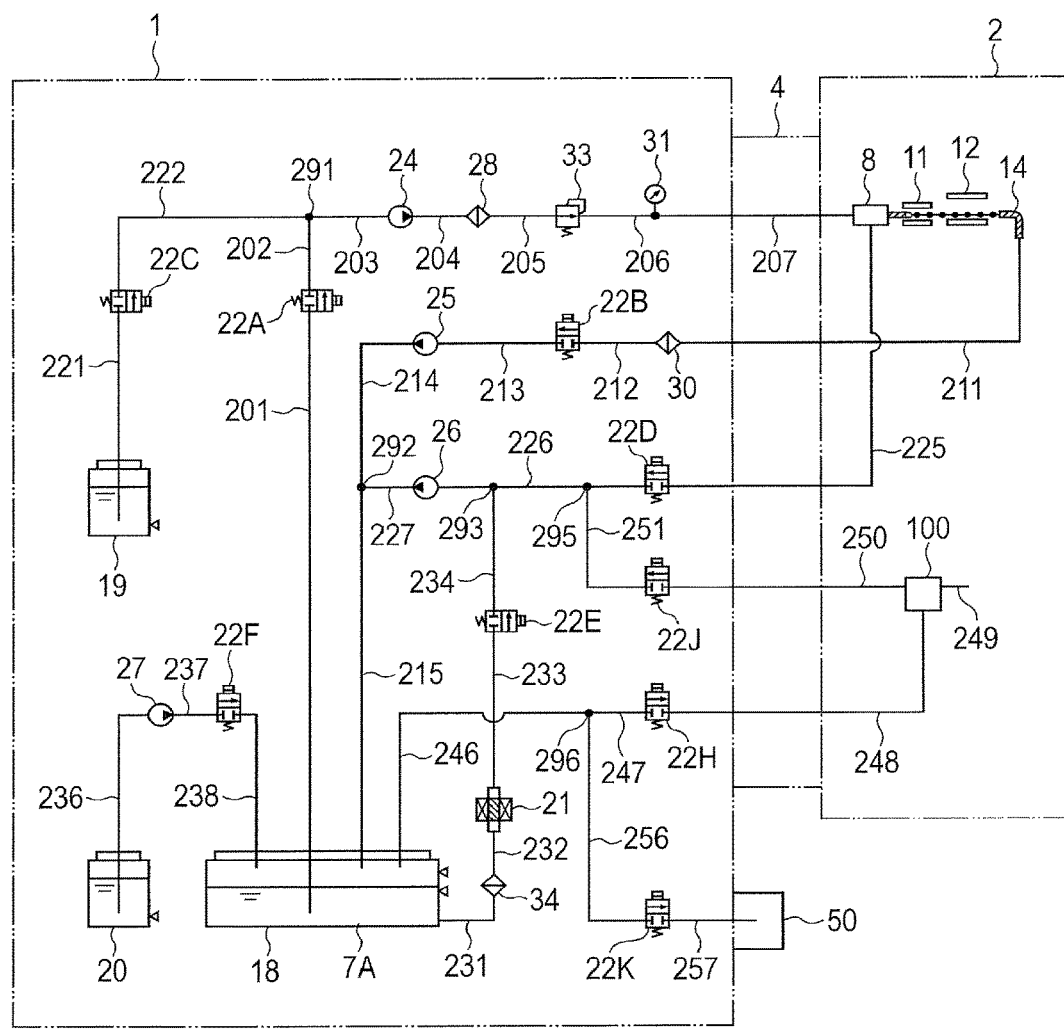
FIG. 17 is a view showing a path structure of an inkjet recording apparatus of a sixth example.

FIG. 17 shows an overall path structure of an inkjet recording apparatus 500 in the case where the gas-liquid separator of a sixth example is set in the print head 2. Explanation of the same part as that of the fifth example will be omitted, and the different feature will only be explained hereinafter.

The inkjet recording apparatus 500 includes the main body 1, the print head 2, and the cable 4 for connecting the main body 1 and the print head 2. One of the gas-liquid separator 100A described in the first example, the gas-liquid separator 100B described in the second example, the gas-liquid separator 100C described in the third example, and the gas-liquid separator 100D described in the fourth example may be employed as the gas-liquid separator 100 provided in the print head 2.

An explanation will be made with respect to the exhaust path and the solvent gas circulation path of the path structure in the inkjet recording apparatus having the gas-liquid separator of the sixth example provided in the print head referring to FIG. 17. Referring to FIG. 17, the main ink container 18 is connected to a branch path 296 via a path 246. The branch path 296 is connected to a solenoid valve 22H for opening and closing the flow channel via a path 247. The solenoid valve 22H is connected to the gas-liquid separator 100 provided in the print head 2 via a path 248 passing through the cable 4. The gas-liquid 2-phase outlet pipe of the gas-liquid separator 100 is provided in the main body 1 via a path 250 passing through the cable 4, and connected to a solenoid valve 22J for opening and closing the flow channel. The solenoid valve 22J is connected to a junction path 295 which joins with the path 226 via a path 251.

Figure 30:
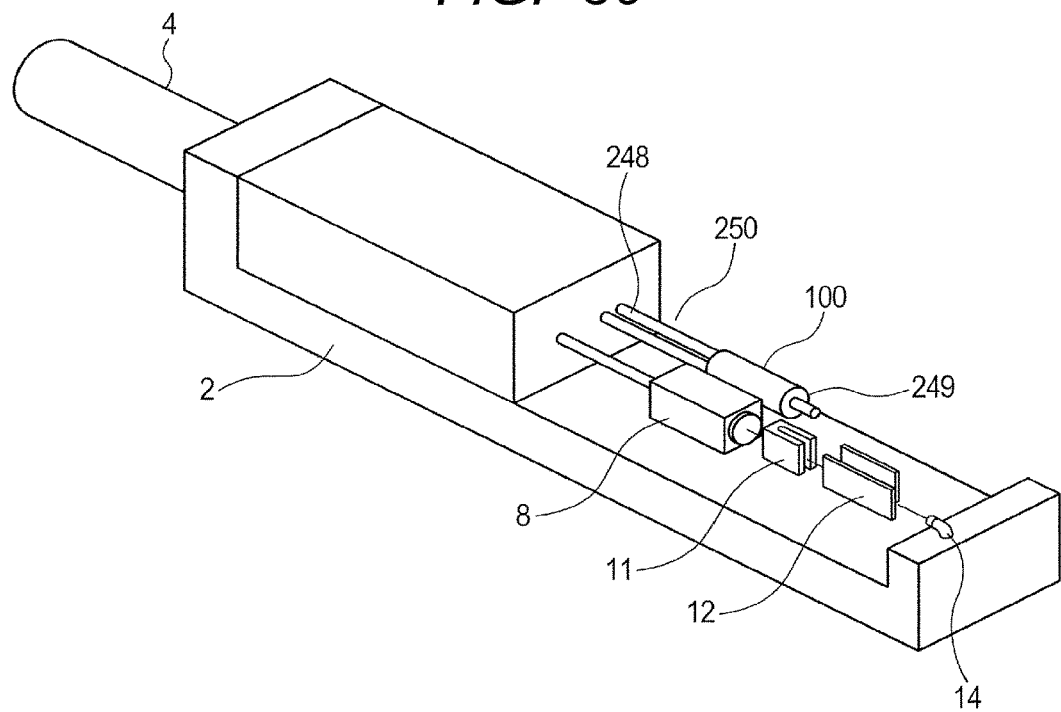
FIG. 30 is a perspective view showing an inner structure of a print head of an inkjet recording apparatus of a sixth example.

An operational behavior of the inkjet recording apparatus 500 of the sixth example according to the present invention will be described. In the sixth example, the gas-liquid separator is provided in the head of the inkjet recording apparatus as shown in FIG. 30. FIG. 30 is a view illustrating that the print head cover 52 is removed, and the gas-liquid separator 100 is connected to the paths 248 to 250. Such structure allows the solvent gas to be discharged from the path 249, and increase in the solvent vapor concentration in the inner space defined by attaching the print head cover 52. The set-up direction of the print head 2 is not set, and therefore, it needs to be omni-directional. Accordingly, the gas-liquid separator 100 is required to cover the omni-directional set-up.

Figure 31:
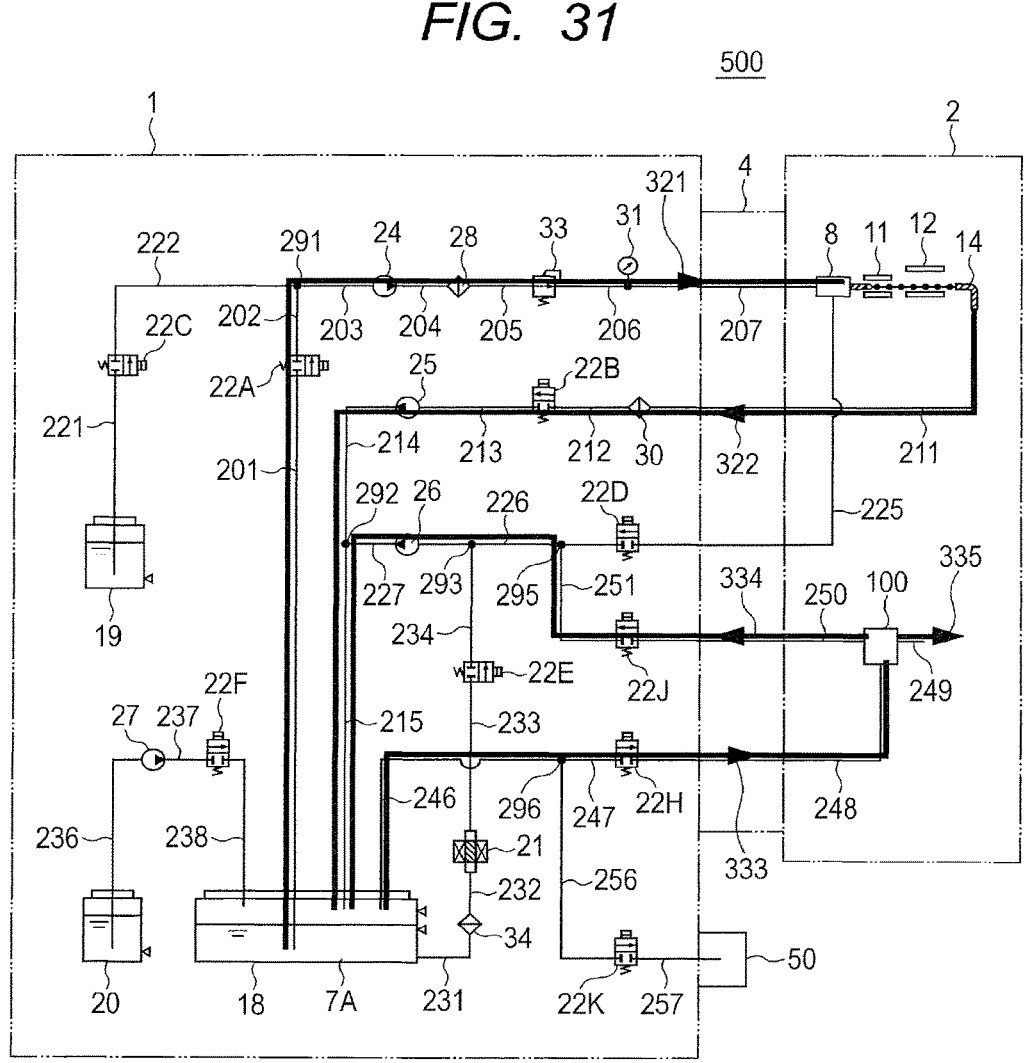
FIG. 31 is a view showing fluid paths of the ink, air and solvent in the bold lines during the printing operation in a form according to the sixth example.

FIG. 31 is a view showing a fluid path indicating the ink flow and the air flow in bold lines when the printing operation is performed (ink is ejected from the nozzle 8) by the inkjet recording apparatus 500 of the example. Explanation of the ink supply flow 321 and the ink recovery flow 322 which are the same as those described in the sixth example will be omitted. Referring to FIG. 31, a solvent gas circulation flow 333, a liquid recovery flow 334, and a solvent gas supply flow 335 will be described. On the liquid recovery path, electricity is applied to the solenoid valve 22J to open the flow channel. As the liquid recovery flow 334 indicates, the pump (for circulation) 26 is operated so that the liquid flowing into the gas-liquid separator 100 is recovered into the main ink container 18. On the liquid recovery flow 334, the solvent vapor saturated with the liquid is flowing in the gas-liquid mixture state. In this state, each flow rate of the liquid and the solvent vapor is approximately 2.5 ml/h (ambient temperature of 20° C.), and approximately 80 ml/m, respectively.

The main ink container 18 is configured to receive and keep the ink flowing on the ink recovery flow 322 and the liquid flowing on the liquid recovery flow 334. The solvent vapor at approximately 230 ml/m (150+80) as a total of the solvent vapor (approximately 150 ml/m) on the ink recovery flow 322 and the solvent vapor on the liquid recovery flow 334 (approximately 80 ml/m) flows into the main ink container 18. Electricity is then applied to a solenoid valve 22H to open the flow channel so that the solvent vapor passes through the path 248 as indicated by the solvent gas circulation flow 333, and flows into the gas-liquid separator 100. The temperature difference between the main ink container 18 and the gas-liquid separator 100 partially liquefies approximately 230 ml/m of the solvent vapor (for example, approximately 2.5 ml/h) (ambient temperature: 20° C.) so that the resultant liquid flows into the gas-liquid separator 100. The liquid may be suctioned from the liquid recovery path 250 in the gas-liquid separator 100. On the path 249, the gas (solvent gas at a flow rate of approximately 150 ml/m) is discharged into the print head 2. This flow is indicated as the solvent gas supply flow 335 in the drawing.

The solvent gas with high saturated vapor concentration is suctioned from the gutter 14 in the print head 2. Although the ink and air in the gas-liquid mixture state flows on the ink recovery flow 322, volatilization of the solvent component in the ink may be suppressed. The gas-liquid separator 100 prevents the liquid from flowing into the print head 2.

Figure 32:
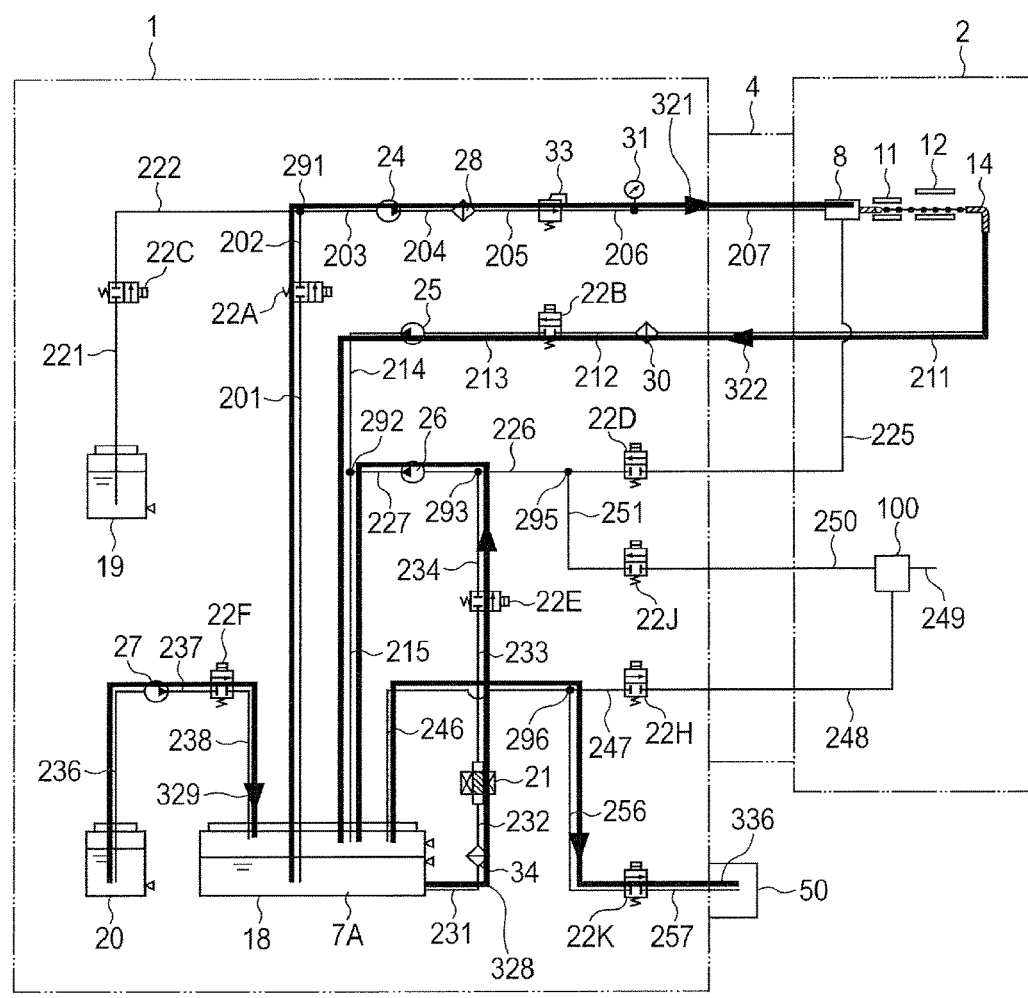
FIG. 32 is a view showing fluid paths of the ink, air and solvent in bold line during the viscosity measurement or the solvent supply in a form according to the sixth example.

FIG. 32 is a view showing a fluid path indicating the ink flow, the air flow and the solvent flow in bold lines when the viscosity is measured and the solvent is supplied in the inkjet recording apparatus 500 of the example. Explanations of the ink supply flow 321 and the ink recovery flow 322 which are the same as those shown in FIG. 31 will be omitted. Explanation of the viscosity measurement ink flow 328 and the solvent supply flow 329, which are the same as those described in the fifth example will also be omitted.

Referring to FIG. 32, electricity is applied to a solenoid valve 22K to open the flow channel so that the solvent gas flowing into the main ink container 18 from the ink recovery flow 322 is discharged from the gas-liquid separator 100 to the exhaust cable 50 as indicated by the exhaust flow 336. It is, then discharged to the outside of the apparatus. In the aforementioned operation, the pump (for circulation) 27 is differently used dependent on the liquid recovery flow 334 and the viscosity measurement ink flow 328. As the exhaust flow 336 shows, the pump (for circulation) 27 may be used for different usage when discharging the solvent gas to the outside of the apparatus. Meanwhile, it may be operated for temporarily increasing the solvent consumption.

Figure 33:
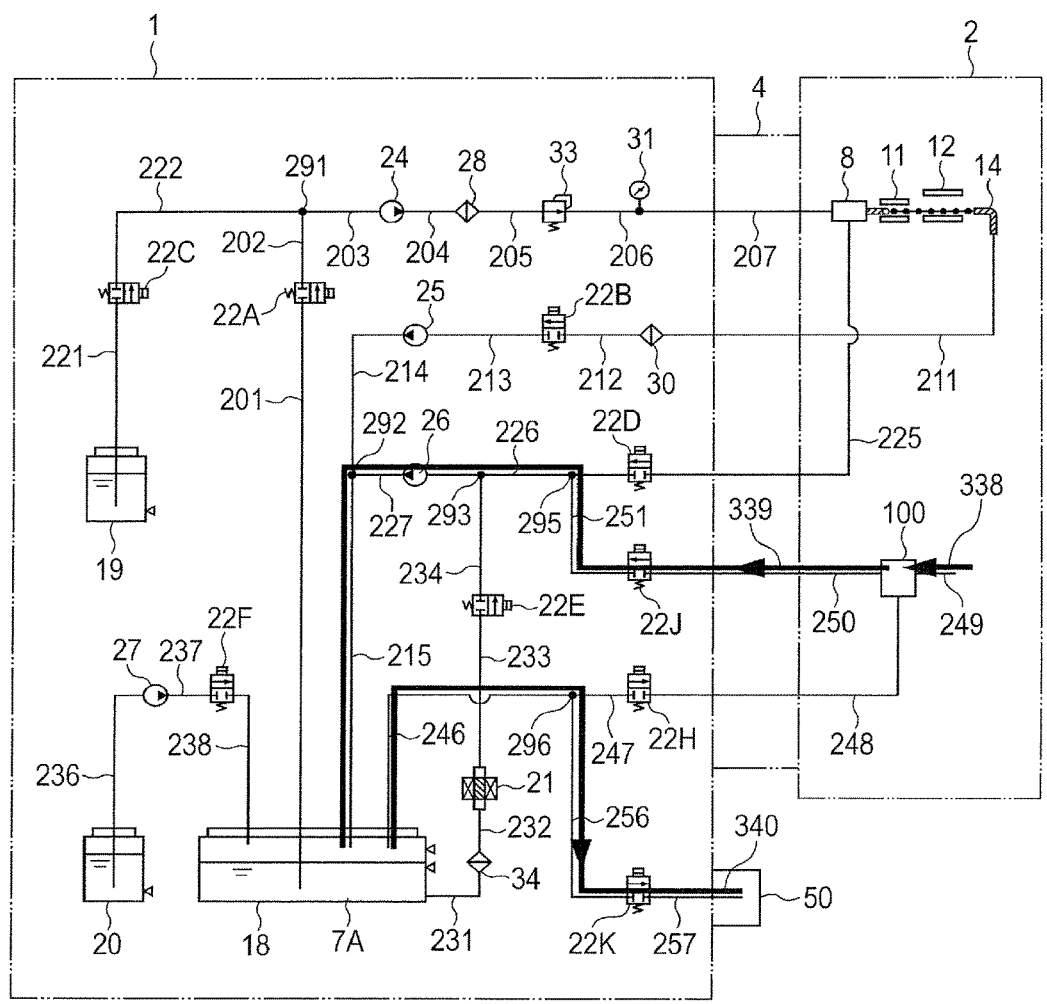
FIG. 33 is a view showing fluid paths of the ink, air and solvent in bold lines during reverse cleaning of the gas-liquid separator in a form according to the sixth example.

FIG. 33 is a view showing a fluid path indicating a cleaning liquid flow and the air flow in bold lines when cleaning of the gas-liquid separator 100 in the inkjet recording apparatus 500 of the example. When cleaning the gas-liquid separator 100 stained with ink, electricity is applied to the solenoid valve 22J to open the flow channel, and the pump (for circulation) 26 is operated as shown in FIG. 33. Then the cleaning liquid (solvent) is applied to the hole of the path 249 in the gas-liquid separator 100 for the solvent gas supply using a cleaning bottle, and the cleaning liquid is suctioned to clean inside of the gas-liquid separator 100 by removing the ink. FIG. 33 shows gas-liquid separator reverse cleaning liquid flows 338, 339 indicating the cleaning liquid flow and the air flow, respectively. At this time, as the exhaust flow 340 indicates, air suctioned from the gas-liquid separator 100 together with the cleaning liquid passes through the gas-liquid separator 100, and discharged to the outside of the apparatus by applying electricity to the solenoid valve 22K to open the flow channel.

Figure 18:
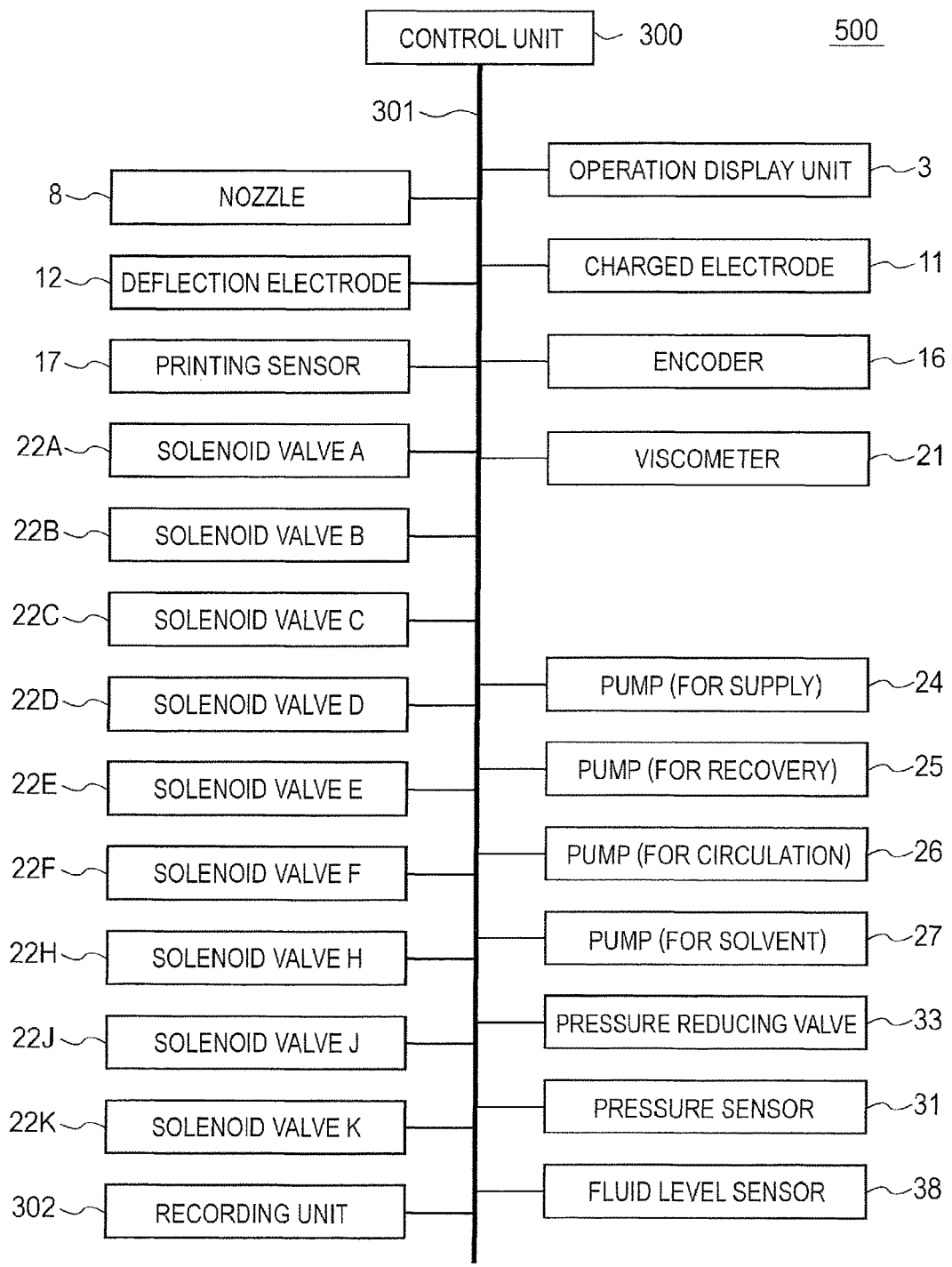
FIG. 18 is a functional block diagram of the inkjet recording apparatus shown in FIG. 17.

FIG. 18 shows a functional block diagram of the inkjet recording apparatus of the sixth example. Referring to the functional block diagram shown in FIG. 18, the inkjet recording apparatus 500 is provided with the control unit 300 with an MPU, for example. The control unit 300 is configured to control respective components including the operation display unit 3, the nozzle 8, the charged electrode 11, the deflection electrode 12, the encoder 16, the printing sensor 17, the viscometer 21, the solenoid valves 22A to 22K, the pumps 24 to 27, the pressure reducing valve 33, the fluid level sensor 38 and the recording unit 302 via a bus line 301. The recording unit 302 stores the program for controlling the inkjet recording apparatus 500. The control unit 300 is configured to control the respective components that constitute the inkjet recording apparatus 500 based on the program. The recording unit 302 records the appropriate ink viscosity for printing, that is, upper limit value (η max) and a lower limit value (η min) for printing.

The inkjet recording apparatus is required to control the viscosity of the ink discharged from the nozzle in the range that allows appropriate printing operation. If the ink viscosity deviates from the appropriate range, the position at which the ink discharged from the nozzle is atomized is changed, and the phenomenon that the ink particles cannot be uniformly shaped. This may fail to apply desired amount of electric charge to the ink particle, resulting in inappropriate printed result. In order to avoid the aforementioned phenomena, the inkjet recording apparatus requires means for adjusting the ink viscosity and keeping the viscosity of the ink in a predetermined range.

In the case where the ink density is lowered by the solvent in the inkjet recording apparatus 500, it will take time to recover the ink density to the normal value because of small solvent consumption in operation. The control for recovering the ink density to the normal value is conducted by temporarily increasing the solvent consumption when the measured viscosity of the ink is equal to or smaller than the specified value.

On the assumption of a generally employed inkjet recording apparatus (air suction quantity from the gutter 14 is 150 ml/m, and an inner temperature rise in the main body is obtained by ambient temperature+8° C.) under the condition of the ambient temperature at 20° C., the solvent consumption in operation is approximately 5 ml/h. Meanwhile, the inkjet recording apparatus 500 as the sixth example feeds the solvent gas dissolved with the volatilized solvent owing to the temperature rise in the main body 1 to the gas-liquid separator 100 in the print head 100. On the assumption that the conditions of "28° C. (temperature in the main body 1)–22° C. (temperature in the print head 2)=Δ6° C." is established, the solvent component contained in the solvent gas is condensed and liquefied owing to the temperature drop of Δ6° C. Then the resultant liquid passes through the gas-liquid separator 100 so as to be recovered to the main ink container 18 in the main body 1 for re-use.

A gas outlet 112 of the gas-liquid separator 100 is formed in the print head 2 so that the solvent gas concentration in the print head cover 52 is increased to suction the solvent gas therefrom from the gutter 14 instead of air outside the print head cover 52. This makes it possible to prevent volatilization of the solvent component of the ink on the ink recovery path. This may suppress the solvent consumption in operation to approximately 2.5 ml/h.

The inkjet recording apparatus of the example is capable of reducing the running cost of the customer by further decreasing the solvent consumption compared with the fifth example. The customer's work environment may also be improved by reducing the discharge of the solvent gas from the main body.

Seventh Example

Figure 19:
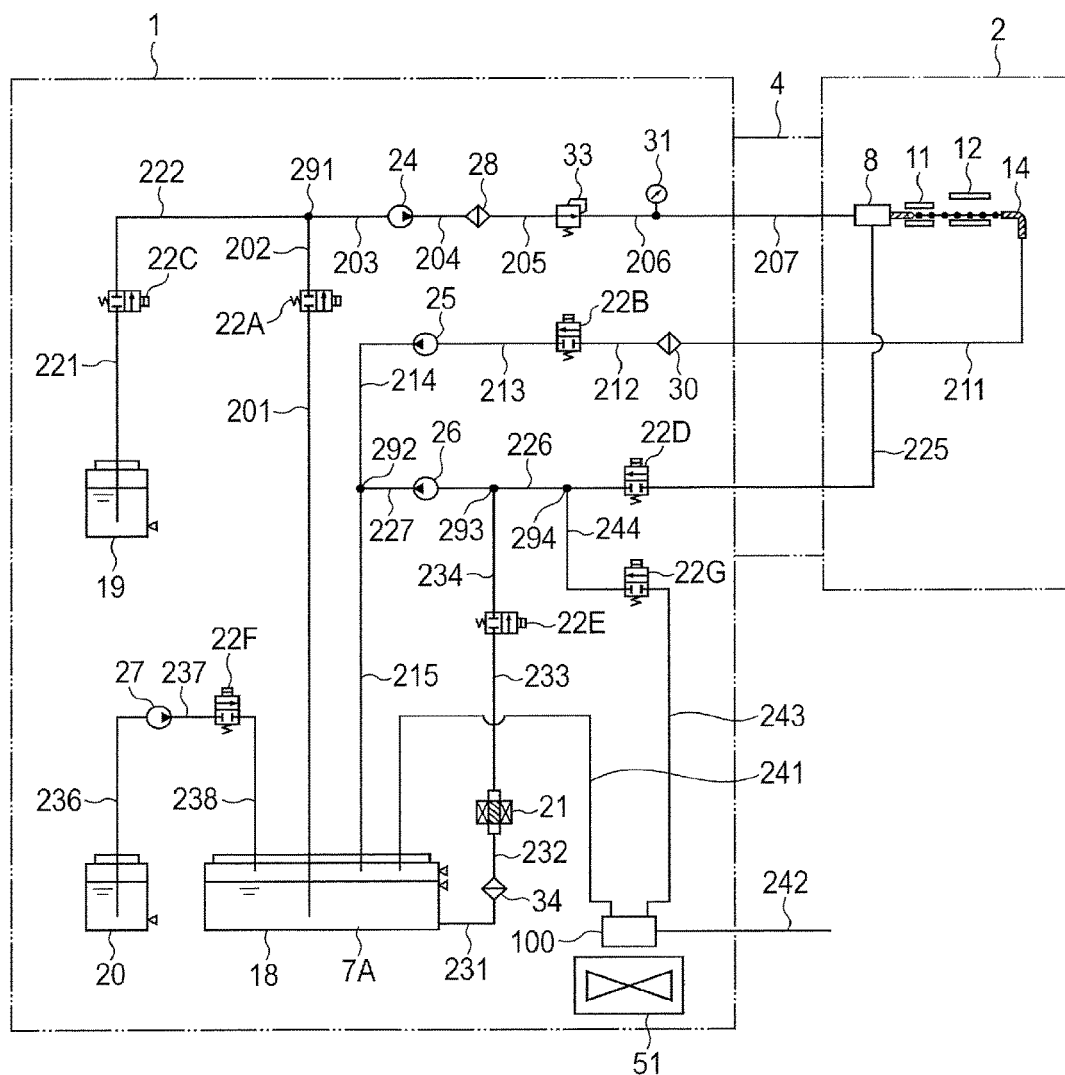
FIG. 19 is a view showing a path structure of an inkjet recording apparatus of a seventh example.

An explanation will be made with respect to an overall path structure of an inkjet recording apparatus 600 when setting the gas-liquid separator of a seventh example in the main body of the inkjet recording apparatus referring to FIG. 19. Explanation of the same features of the seventh example as those described in the fifth and the sixth examples will be omitted. Only different features will be described. Referring to FIG. 19, the main ink container 18 is connected to the gas-liquid separator 100 set in the main body 1 via the path 241. The liquid outlet pipe of the gas-liquid separator 100 is connected to a solenoid valve 22G for opening and closing the flow channel via a path 243. The solenoid valve 22G is connected to the junction path 294 that joins with the path 226 via a path 244. The liquid from the gas-liquid separator 100 returns to the main ink container 18 via the paths 294, 226, 227 and 215. The gas separated from the gas-liquid separator 100 is discharged via the path 242. The gas-liquid separator 100 and the path 241 are cooled by the fan 51 for the purpose of increasing the solvent recovery quantity by the gas-liquid separator 100.

The example ensures the inkjet recording apparatus with reduced outer dimension by setting the gas-liquid separator 100 in the apparatus so as to reduce the number of the projecting parts of the main body 1 compared with the fifth example.

Eighth Example

Figure 20:
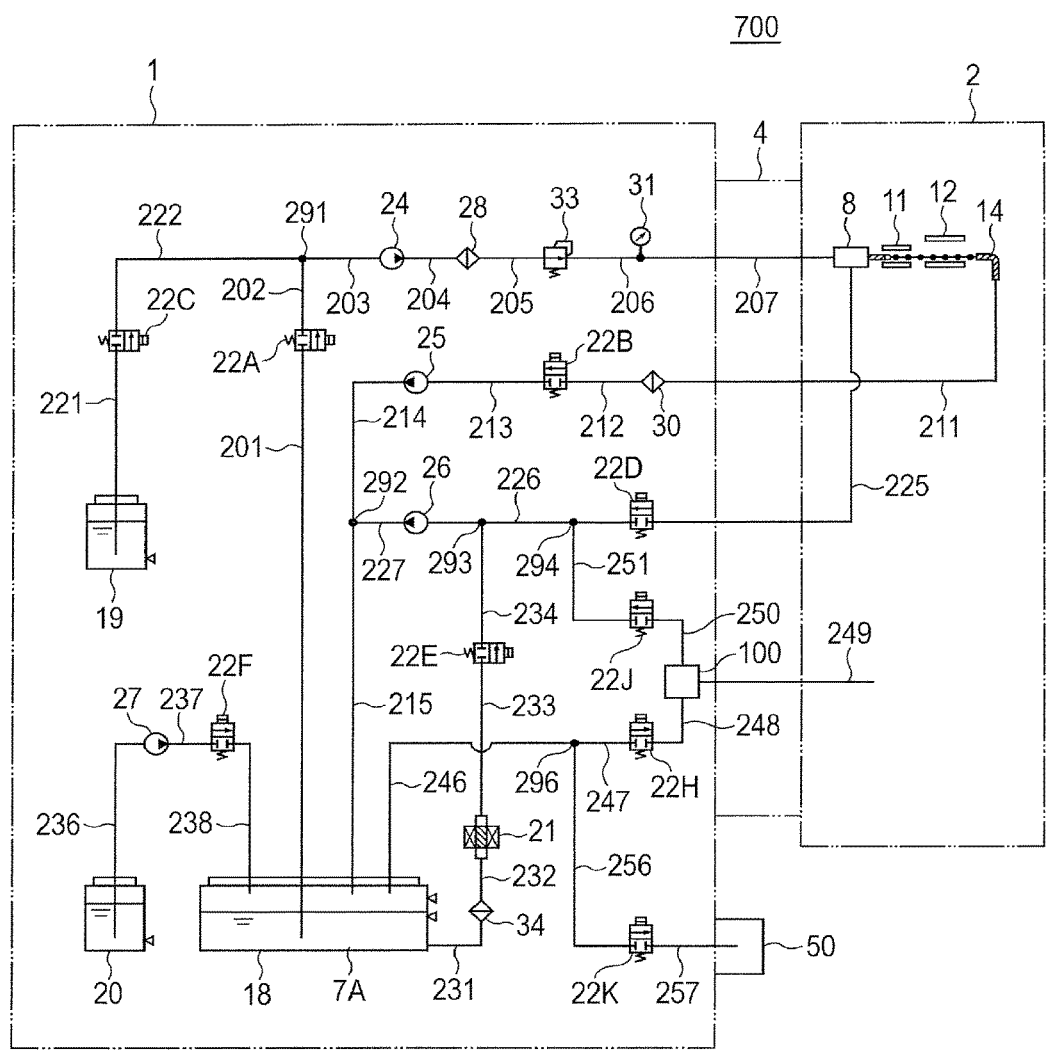
FIG. 20 is a view showing a path structure of an inkjet recording apparatus of an eighth example.
Figure 21:
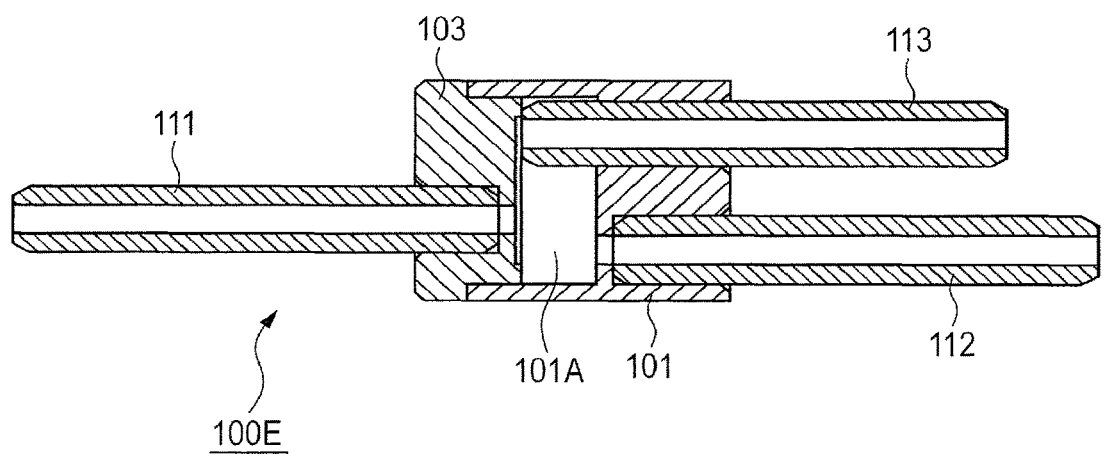
FIG. 21 is an overall sectional view of a gas-liquid separator in another form of the first example.

An explanation will be made with respect to an overall path structure of an inkjet recording apparatus 700 when setting the gas-liquid separator of an eighth example in the main body of the inkjet recording apparatus referring to FIG. 20. Explanation of the same features of the eighth example as those described in the fifth, the sixth and the seventh examples will be omitted. Only different features will be described. Referring to FIG. 20, the main ink container 18 is connected to the branch path 296 via the path 246. The branch path 296 is connected to the solenoid valve 22H for opening and closing the flow channel via the path 247. The solenoid valve 22H is connected to the gas-liquid separator 100. The liquid outlet pipe of the gas-liquid separator 100 is connected to the solenoid valve 22J for opening and closing the flow channel via a path 250. The solenoid valve 22J is connected to a junction path 295 that joins with the path 226 via the path 251. The liquid separated from the gas-liquid separator 100 via the paths 226, 227 and 215 returns to the main ink container 18. The solvent gas separated from the gas-liquid separator 100 is fed into the print head 2 via the path 249 passing through the cable 4 so as to fully fill the inside of the print head with the solvent gas. As the print head is fully filled with the solvent gas, the ink particles and the solvent gas are recovered by the gutter rather than air and the ink particles upon recovery of the ink particle using the gutter. This makes it possible to prevent decrease in the solvent of the overall inkjet recording apparatus.

In the example, the gas-liquid separator 100 is set in the apparatus so as to make the print head 2 more compact than the sixth example. As the number of the paths passing through the cable 4 is reduced, it is possible to provide the inkjet recording apparatus with reduced manufacturing costs.

What is claimed is:
1. A gas-liquid separating apparatus comprising:
   a casing with at least one chamber which accumulates gas and liquid inside;
   a gas-liquid 2-phase inlet pipe attached to the casing and connected to the at least one chamber;
   a gas outlet pipe for discharging gas in the at least one chamber; and
   a gas-liquid 2-phase outlet pipe for discharging liquid in the at least one chamber, wherein the gas-liquid 2-phase outlet pipe is protruded into the at least one chamber, and a gap is formed between the protruded gas-liquid 2-phase outlet pipe and the at least one chamber.

2. The gas-liquid separating apparatus according to claim 1, wherein the at least one chamber has a cylindrical shape.

3. The gas-liquid separating apparatus according to claim 2, wherein the gas-liquid 2-phase outlet pipe and the gas outlet pipe are symmetrically arranged with respect to a center of a circle of the at least one chamber.

4. The gas-liquid separating apparatus to claim 1,
wherein the at least one chamber is formed by combining a first casing to which the gas-liquid 2-phase inlet pipe is connected, and a second casing to which the gas outlet pipe and the gas-liquid 2-phase outlet pipe are connected, and
the gas-liquid 2-phase outlet pipe is protruded to an innermost part of the at least one chamber to form a gap with the first casing, and further forms a gap with an inner peripheral wall of the at least one chamber.

5. The gas-liquid separating apparatus according to claim 1,
wherein the at least one chamber is formed by combining a first casing to which the gas-liquid 2-phase inlet pipe is connected and a second casing to which the gas outlet pipe and the gas-liquid 2-phase outlet pipe are connected, and
a block is provided in the at least one chamber between the gas-liquid 2-phase outlet pipe and the first casing to form gaps between the gas-liquid 2-phase outlet pipe and the block, the second casing and the block, and the first casing and the block.

6. The gas-liquid separating apparatus according to claim 1,
wherein the at least one chamber is formed by combining a first casing to which the gas-liquid 2-phase inlet pipe is connected, and a second casing to which the gas outlet pipe and the gas-liquid 2-phase outlet pipe are connected, and
the gas-liquid 2-phase outlet pipe is protruded to an innermost part of the at least one chamber, and a porous plate is provided in the at least one chamber between the gas-liquid 2-phase outlet pipe and the first casing.

7. The gas-liquid separating apparatus according to claim 1,
wherein the at least one chamber is formed by combining a first casing to which the gas-liquid 2-phase inlet pipe is connected, and a second casing to which the gas outlet pipe and the gas-liquid 2-phase outlet pipe are connected, and
the gas-liquid 2-phase outlet pipe is protruded to an innermost part of the at least one chamber to have a double-layered structure.

8. The gas-liquid separating apparatus according to claim 1, wherein the gas-liquid 2-phase inlet pipe and the gas outlet pipe are interchangeable.

9. An inkjet recorder comprising:
an ink container for accumulating an ink stored in a main body;
a nozzle for discharging the ink as an ink particle for printing on an object to be printed;
an ink supply flow channel for supplying the ink to the nozzle from the ink container;
a gutter for recovering the ink particle discharged from the nozzle, which has been unused for the printing;
an ink recovery flow channel for recovering the ink particle recovered by the gutter into the ink container;
an exhaust path connected to the ink container for discharging a solvent gas from the ink container; and
a gas-liquid separating unit for subjecting a condensate of the solvent gas formed owing to a temperature drop to gas-liquid separation in the exhaust path,
wherein the gas-liquid separating unit includes a casing with a cylindrical chamber which accumulates gas and liquid inside, a gas-liquid 2-phase inlet pipe attached to the casing and connected to an inner chamber, a gas outlet pipe for discharging gas of a gas-liquid mixture flowing into the chamber, and a gas-liquid 2-phase outlet pipe for discharging liquid of the gas-liquid mixture flowing into the chamber, and
the gas-liquid 2-phase outlet pipe is protruded into the chamber, and a gap is formed between the protruded gas-liquid 2-phase outlet pipe and the chamber.

10. The inkjet recorder according to claim 9, wherein the inkjet recording apparatus is formed of the main body and a print head for printing, and the gas-liquid separating unit is installed in the print head.

11. The inkjet recorder according to claim 9, wherein the inkjet recording apparatus is formed of the main body and a print head for printing, and the gas-liquid separating unit is provided to an inside or an outside of the main body.

12. The inkjet recorder according to claim 9, comprising a fan for cooling the gas-liquid separating unit.

13. The inkjet recorder according to claim 9,
wherein the gas-liquid separating unit discharges the solvent gas separated by the gas-liquid separator into the print head.

14. The inkjet recorder according to claim 13,
wherein the solvent gas discharged from the gas-liquid separating unit are recovered by the gutter, and the recovered solvent gas discharges by the ink recovery flow channel into the ink container.

15. An inkjet recorder which has a main body and a print head comprising:
an ink container for accumulating an ink stored in the main body;
a nozzle, which is provided to the print head, for discharging the ink as an ink particle for printing on an object to be printed;
an ink supply flow channel for supplying the ink to the nozzle from the ink container;
a gutter, which is provided to the print head, for recovering the ink particle discharged from the nozzle, which has been unused for the printing;
an ink recovery flow channel for recovering the ink particle recovered by the gutter into the ink container;
an exhaust path connected to the ink container for discharging a solvent gas from the ink container; and
a gas-liquid separating unit located on the exhaust path, which is connected to the ink container and provided to the print head, for separating liquid and gas passing through the exhaust path.

16. The inkjet recorder according to claim 15, wherein the gas-liquid separating unit discharges the solvent gas separated by the gas-liquid separator into the print head.

17. The inkjet recorder according to claim 16, wherein the solvent gas discharged from the gas-liquid separating unit are recovered by the gutter, and the recovered solvent gas discharges by the ink recovery flow channel into the ink container.

* * * * *